United States Patent
Ishikawa et al.

(10) Patent No.: US 6,796,334 B2
(45) Date of Patent: Sep. 28, 2004

(54) DUCT REPAIRING MATERIAL, REPAIRING STRUCTURE, AND REPAIRING METHOD

(75) Inventors: Masatoshi Ishikawa, Osaka (JP); Hitoshi Saito, Osaka (JP); Futoshi Makimoto, Hyogo (JP)

(73) Assignees: Ashimori Industry Co., Ltd., Osaka (JP); Ashimori Engineering Co., Ltd., Tokyo (JP)

( * ) Notice: Subject to any disclaimer, the term of this patent is extended or adjusted under 35 U.S.C. 154(b) by 42 days.

(21) Appl. No.: 10/258,991
(22) PCT Filed: May 1, 2001
(86) PCT No.: PCT/JP01/03760
§ 371 (c)(1),
(2), (4) Date: Oct. 31, 2002
(87) PCT Pub. No.: WO01/84037
PCT Pub. Date: Nov. 8, 2001

(65) Prior Publication Data
US 2003/0116210 A1 Jun. 26, 2003

(30) Foreign Application Priority Data

| May 1, 2000 | (JP) | ........................................ | 2000-132258 |
| Feb. 21, 2001 | (JP) | ........................................ | 2001-045361 |
| Apr. 6, 2001 | (JP) | ........................................ | 2001-108940 |

(51) Int. Cl.[7] ............................................. F16L 55/16
(52) U.S. Cl. ..................... 138/98; 138/108; 138/120; 138/155; 138/175; 405/150.1; 405/150.2
(58) Field of Search ............................ 138/97, 98, 175, 138/120, 108, 112, 155; 405/150.1, 150.2

(56) References Cited

U.S. PATENT DOCUMENTS

| 780,789 | A | * | 1/1905 | Gardner ...................... 138/145 |
| 1,013,302 | A | * | 1/1912 | Messer ...................... 285/114 |
| 1,167,159 | A | * | 1/1916 | Flannery ...................... 138/105 |
| 1,177,311 | A | * | 3/1916 | Flannery ...................... 138/158 |
| 1,843,334 | A | * | 2/1932 | McGrath ...................... 249/209 |
| 1,880,599 | A | * | 10/1932 | Ukropina ...................... 138/175 |
| 3,957,087 | A | * | 5/1976 | Johnston ...................... 138/178 |
| 4,371,288 | A | * | 2/1983 | Borca et al. ................... 405/53 |
| 4,467,995 | A | * | 8/1984 | Tolliver ...................... 249/160 |
| 4,786,206 | A | * | 11/1988 | Yamamoto et al. ......... 405/146 |
| 4,799,824 | A | * | 1/1989 | Kumai et al. ................ 405/146 |
| 4,813,813 | A | * | 3/1989 | Yamamoto et al. ......... 405/146 |
| 5,186,217 | A | * | 2/1993 | Kallinich et al. ........... 138/149 |
| 5,927,346 | A | * | 7/1999 | Majnaric et al. ............ 138/175 |
| 5,928,447 | A | * | 7/1999 | GianFrancisco ............. 156/94 |
| 5,934,334 | A | * | 8/1999 | Gray, Jr. et al. ............ 138/112 |
| 6,468,000 | B2 | * | 10/2002 | McNally et al. .......... 405/150.1 |
| 2003/0136455 | A1 | * | 7/2003 | Kamiyama et al. ........... 138/98 |
| 2004/0108009 | A1 | * | 6/2004 | Kamiyama et al. ........... 138/97 |

FOREIGN PATENT DOCUMENTS

| JP | 63-88388 A | 4/1988 |
| JP | 63-268832 A | 11/1988 |
| JP | 02-199391 A | 8/1990 |
| JP | 08-277992 A | 10/1996 |
| JP | 10-166444 A | 6/1998 |

* cited by examiner

Primary Examiner—James Hook
(74) Attorney, Agent, or Firm—Wolf, Greenfield & Sacks, P.C.

(57) ABSTRACT

The present invention relates to a conduit repairing material, repairing structure, and repairing method thereof, and particularly provides a repairing method for an existing conduit characterized by comprising using a plurality of reinforcing members capable of being carried in the existing conduit, assembling said reinforcing members into a hollow skeleton-like reinforcing body extending substantially along the inner surface of the existing conduit, attaching a plurality of inner face bars to the inside of the reinforcing body to assemble them into a tubular form along the lengthwise direction of the conduit, and injecting a curable infilling into the gap between the inner face bars and the inner surface of the existing conduit.

31 Claims, 28 Drawing Sheets

Fig. 13
(A)
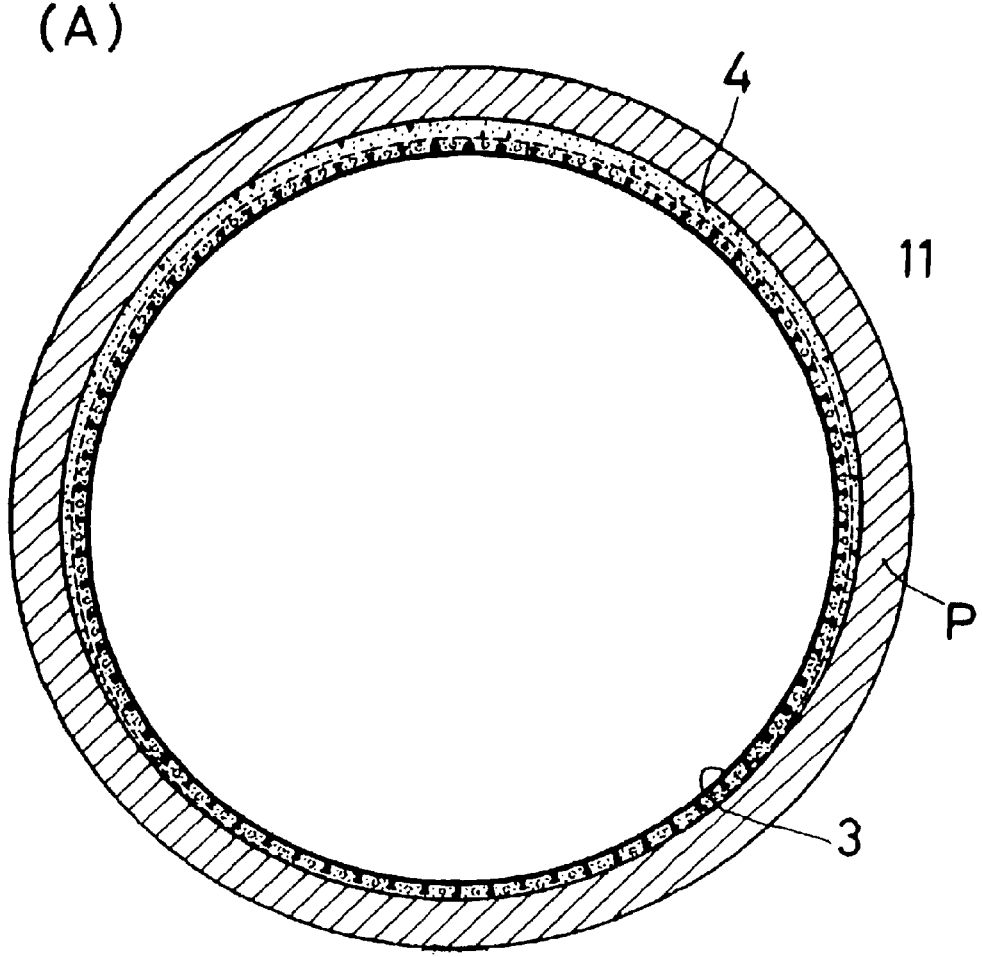
(B)
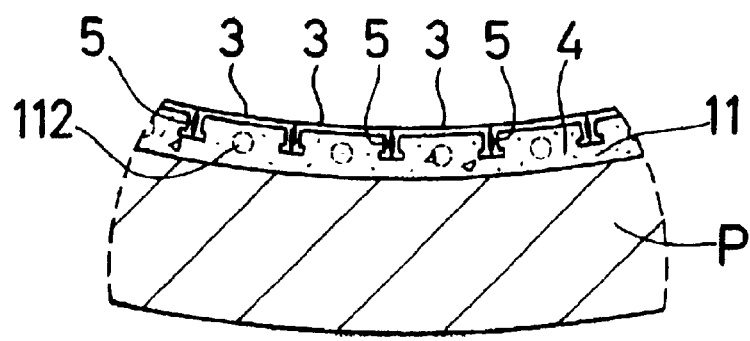

DUCT REPAIRING MATERIAL, REPAIRING STRUCTURE, AND REPAIRING METHOD

TECHNICAL FIELD

The present invention relates to a conduit repairing material, a repairing structure and a repairing method using the same, and particularly relates to a repairing material for repairing degraded existing conduits such as sewer pipes, storm water pipes, and tunnels for various transportation modes, a repairing structure constructed by laying the repairing material, and a repairing method for installing the repairing material in an existing conduit.

BACKGROUND ART

When an existing conduit such as a sewer pipe, a storm water pipe, and a tunnel for various transportation modes is deteriorated, its repair is required depending on the degree of deterioration. When the deterioration of a conduit is minor, it is possible to repair it by applying mortar or other materials partly on the surface. However, when the deterioration is severe or widespread, the whole of a deteriorated conduit needs to be repaired with a repairing material.

Especially for repairing an existing conduit with a large diameter, it is effective to repair the entire conduit with a repairing material; and therefore such a repairing material and a repairing method for repairing an entire conduit are desired.

So far, several methods for repairing existing conduits such as a large diameter sewer pipe have been known.

For example, JP, A,8-277992 discloses a repairing method comprising: preparing a resilient reinforcing steel such as piano wire to be wound in a spiral form along the inner surface of an existing conduit, forming a tubular liner by winding a strip-like plastic plate over the reinforcing steel, and injecting a curable infilling (grouting material) such as mortar between the liner and the inner surface of the existing conduit. In this method, however, the reinforcing steel such as piano wire is not engaged with the plastic plate, and therefore the plastic plate itself is not reinforced. Therefore, when it is applied to repairing of a buried pipe, the curable infilling such as a mortar layer would be subject to cracks caused by vibrations due to vehicle passage or earthquakes. Thus, underground water will permeate through the cracks thereby directly applying water pressure against the plastic plate, and this may cause the plastic plate to bulge into the conduit at positions where the adhesion strength between the curable infilling such as mortar and the plastic plate is insufficient.

JP, A, 10-166444 discloses a repairing method which comprises: preparing a resilient strip-like plastic plate, which is to be formed into a liner by spirally winding it in an existing conduit, to bring it into engagement with a long reinforcing body containing a reinforcing steel, forming a liner by spirally winding the plastic plate along the inner surface of the existing conduit, and injecting a grouting material such as mortar between the liner and the inner surface of the existing conduit. In this method, although the plastic plate is reinforced by being integrated with a reinforcing body containing reinforcing steel in advance, it is not possible to employ a reinforcing body having a sufficient rigidity because the plastic plate needs to be spirally wound in the existing conduit. Therefore, when the existing conduit does not have enough strength, the reinforcement against the earth loads will not be sufficient.

In each of the above described conventional repairing methods for existing conduits, a reinforcing steel is utilized to raise the strength of the conduit after it is repaired; however, it is hardly assured that the plastic plate be reinforced to a sufficient level. Furthermore, when injecting mortar or the like between the existing conduit and the liner, it is necessary to place a supporting on the inner surface of the liner or to perform grouting with mortar or the like in several split operations adding one after another to prevent the deformation of the spirally wound plastic plate due to the pressure of the injection. And this would make the execution of the laying operation complex and time consuming.

On one hand, conventionally, there is known a construction method in which a lining material is laid along the inner surface of an existing conduit, and a grouting material such as mortar and cement milk is injected into a gap between the lining material and the inner surface of the existing conduit to be cured.

This type of construction methods, as disclosed, for example, in JP, A, 63-88388, typically utilizes a repairing method which comprises: preparing an injection hose to be inserted into a tubular gap formed between the inner surface of an existing conduit and the lining material, filling the opening parts of the tubular gap at its both ends in the lengthwise direction with mortar for sealing, and in that state, injecting a grouting material into the tubular gap through the injection hose.

However, in the conventional method in which a grouting material is injected in a state that the opening parts at both ends of the gap between the inner surface of an existing conduit and the lining material are sealed up with mortar, it was impossible to start injecting the grouting material until the sealing mortar is cured, and also it was required to conduct the injection of the grouting material at a low pressure since the sealing by the mortar may be destroyed due to the pressure during the injection of the grouting material. Moreover, when water is flowing inside the existing conduit, it is difficult to apply complete sealing with mortar, and thus the grouting material may flow out through part of the sealing. For these reasons, the conventional construction method in which both ends of the gap are sealed up with mortar had a problem in that the operation of injecting the grouting material is inefficient and time consuming.

DISCLOSURE OF THE INVENTION

In order to solve the above described problems, it is an object of the present invention to provide a repairing method for an existing conduit, in which the inner face bar such as a plastic plate forming the inner surface of the repaired conduit will not be directly subject to exterior water pressure, the existing conduit will be reinforced even when it has a low strength, and repairing work can be easily carried out without need of counter measures such as placing a supporting when injecting a curable infilling (grouting material) such as mortar, and also to provide a repairing material to be used for the method and the repairing structure obtained by the repairing method.

It is another object of the present invention to provide a grouting structure for the end parts of a repairing material for a conduit, whereby the end parts of the gap into which the grouting material is injected can be securely sealed up without being affected by the surface conditions of the existing conduit such as running water, the injection of the grouting material can be performed stably at a high pressure, and moreover a high quality of the grouting material after curing can be secured.

To achieve the above described objective, the present invention provides a repairing method for an existing conduit, characterized by comprising: preparing a plurality of reinforcing members capable of being carried into the existing conduit, assembling the reinforcing members into a hollow skeleton-like reinforcing body extending substantially along the inner surface of the existing conduit, attaching a plurality of inner face bars to the inside of the reinforcing body to assemble then into a tubular form along the length of the existing conduit, and thereafter injecting a curable infilling into a gap between the inner face bar and the inner surface of the existing conduit.

In the repairing method for an existing conduit according to the present invention, it is possible to adopt a method in which a plurality of fixing bars are attached to the inside of the above described reinforcing body, and the above described inner face bars are fitted into the fixing bars. When using such fixing bars to attach the inner face bars onto the reinforcing body, the fixing bar is preferably a long member continuous along the lengthwise direction of the existing conduit.

Also, in the repairing method for an existing conduit according to the present invention, the above described inner face bar is preferably a long body continuous in the lengthwise direction of the existing conduit.

In the repairing method for an existing conduit according to the present invention, it is possible to suitably adopt a method in which a plurality of ring-like reinforcing members extending substantially along the inner periphery of the existing conduit are placed at a predetermined interval in the lengthwise direction to be assembled, and then each ring-like reinforcing member is integrated with each other in the length wise direction of the existing conduit by use of connecting members.

Moreover, in the repairing method for an existing conduit according to the present invention, it is possible to suitably adopt a method in which circumferentially divided parts of the ring-like reinforcing member are assembled together outside the existing conduit by means of connecting members into partial reinforcing bodies and thereafter the partial reinforcing bodies are carried into the existing conduit to be assembled into the reinforcing body.

Furthermore, in the method of the present invention, it is preferable to provide a space-infilling on the outer periphery of the reinforcing body so that the gap between the inner peripheral surface of the existing conduit and the reinforcing body will be reduced or eliminated.

Also, in the method of the present invention, it is possible to adopt a method in which the above described reinforcing body is assembled after a tubular surface bar extending along the inner surface of the existing conduit is placed on the inner surface of the existing conduit.

Moreover, in the method of the present invention, the injection of curable infilling may be conducted from an injection opening for grouting material formed in the permeable material that is provided near the end parts of the repairing material.

It is preferable to inject a curable infilling using an end structure of the repairing material to be described later for injecting the grouting material into the gap formed between the inner surface of the existing conduit and the repairing material laid inside the conduit.

On one hand, the repairing material for an existing conduit according to the invention is a repairing material suitable for use in the above described repairing method of the present invention. According to its one embodiment, the repairing material is characterized by comprising: a reinforcing body having a hollow skeleton structure extending substantially along the inner surface of the existing conduit, the reinforcing body being assembled from a plurality of circumferentially divided ring-like reinforcing members each of which is provided in its inside with a plurality of fixing parts, and a plurality of inner face bars having a smooth surface to form the inner surface of the conduit.

Also, according to another embodiment, the repairing material of the present invention is characterized by comprising: a reinforcing body having a hollow skeleton structure extending substantially along the inner surface of the existing conduit, the reinforcing body being assembled from a plurality of circumferentially divided ring-like reinforcing members each of which is provided in its inside with a plurality of fixing parts; a plurality of fixing bars which is formed in its outside with a first fixing part to fit into the fixing part and in its inside with a second fixing part; and a plurality of inner face bars having a smooth inner surface and formed in its outer surface or end part with a fixing part to fit into the above described second fixing part. When using such a fixing bar, it is preferable that each fixing bar is configured to be a long member continuous in the lengthwise direction of the existing conduit.

It is also preferable that the inner face bar used in the repairing material for existing conduits according to the present invention is configured to be a long body continuous in the direction of the existing conduit.

Moreover, in the repairing material of the present invention, it is more preferable that the reinforcing body is provided with a plurality of connecting members to connect and integrate ring-like reinforcing members extending substantially along the inner periphery of the existing conduit and to dispose them at a predetermined spacing in the lengthwise direction of the existing conduit.

Furthermore, in the repairing material of the present invention, the reinforcing body is preferably provided in its outer periphery with concavities and convexities to form groove-like gaps at least continuous in the lengthwise direction of the existing conduit, and in stead of or in addition to this, the reinforcing body is preferably formed with a through hole passing in the lengthwise direction of the existing conduit.

Furthermore, in the repairing material of the present invention, the reinforcing may comprise a space-infilling which can be fixed to its outer peripheral, and which thereby can reduce or eliminate the gap between the reinforcing body and the inner surface of the existing conduit.

The repairing structure for a conduit according to the present invention provides a repairing structure to be obtained by using the repairing method for an existing conduit according the present invention and characterized in that: a hollow skeleton structure extending substantially along the inner surface of the existing conduit is disposed in the existing conduit; a plurality of inner face bars continuous in the lengthwise direction of the existing conduit are attached to the inside of the above described reinforcing body, with the inner face bars being disposed like a tubular form extending along the lengthwise direction of the existing conduit; and a curable infilling is provided to fill in between the inner face bars and the inner surface of the existing conduit.

Moreover, in the repairing structure for an existing conduit according to the present invention, the inner face bars may be attached to the reinforcing body via a plurality of fixing bars mounted onto the inside of the reinforcing body. When using such a fixing bar, the fixing bar is preferably configured to be a long member continuous in the lengthwise direction of the existing conduit.

Furthermore, in the repairing structure for conduits according to the present invention, the reinforcing body is preferably configured to comprise a plurality of ring-like reinforcing members extending substantially along the inner surface of the existing conduit, and a plurality of connecting members for connecting and integrating each ring-like reinforcing member in the lengthwise direction of the existing member.

Also in the repairing structure of the present invention, it is possible to suitably adopt a structure in which the reinforcing body is formed with a through hole passing in the lengthwise direction of the existing conduit, and the hole is filled with a curable infilling.

Furthermore, in the repairing structure of the present invention, it is possible to adopt a structure in which a tubular surface bar extending along the inner surface of the existing conduit is interposed between the reinforcing body and the inner surface of the existing conduit.

The present invention is intended to achieve the intended object by a configuration in which the inner face bars, which form the surface (inner surface) of the conduit after repairing, are attached onto the reinforcing body assembled into a hollow skeleton structure extending substantially along the inner surface of the existing conduit so that the reinforcing body has sufficient strength to receive the force acting on the inner face bar.

In the present invention, there is no limitation on the means for attaching the inner face bar to the reinforcing body; fitting using a concavity and convexity provided on both members, or fitting via a fixing bar, or means such as fastening by screws can be adopted.

In the repairing method for existing conduits according to the present invention and the repairing material for use in the repairing method, divided reinforcing members are assembled into a reinforcing body having a hollow skeleton structure extending substantially along the inner surface of the existing conduit, and this makes it possible to change the shape and size of the reinforcing body depending on the condition of the existing conduit and construct a reinforcing body with sufficient strength within the existing conduit corresponding to the degree of the degradation of the conduit, and also to securely reinforce an existing conduit even when it has lost strength. Thus, the repaired conduit will have strength equal to that of a steel-reinforced structure.

In the method of the present invention in which reinforcing members are assembled to form a hollow skeleton-like reinforcing body, it is possible to easily cope with special-shape conduits such as a horseshoe-shape conduit. At the same time, as a result of obtaining sufficient strength of the reinforcing body, it becomes possible to choose a material of a good fluidity and of a low cost such as mortar with a low water content and air mortar thereby providing a method of low cost and enhanced workability.

Also, according to the present invention, since the inner face bars are attached to and supported by the reinforcing body, water pressure from outside will not be applied directly to the inner face bar and there is no need for counter measures against the injection of curable infilling such as constructing a supporting and performing additional injections, thereby making the installation to be performed easily in a short time.

Moreover, in another embodiment, adopting a structure in which the inner face bars are attached to the reinforcing body via fixing bars makes it possible to give margin in the dimensional precision of the fixing part between the reinforcing body and the inner face bar, compared to the case in which the inner face bar is directly fixed to the reinforcing body which is embodied as a rigid body. And this would improve the workability and increase the freedom of choosing the material of the inner face bar in accordance with the required functions for the conduit, for example, exploiting a thermoplastic resin molded part as the fixing bar making it possible to use a rigid body for the inner face bar, thus providing the repairing materials with additional functions such as flame retardancy.

Moreover, when using such a fixing bar, exploiting a plurality of fixing bars continuous in the lengthwise direction of the existing conduit to construct a repairing structure for conduits according to the present invention makes it possible to construct a structure in which the inner face bars, which are to be attached to a plurality of reinforcing members of the reinforcing body, are reinforced. This structure can prevent the deformation of the inner face bar thereby allowing the use of thinner inner face bar. Also using fixing bars of a length extending between adjacent manholes offers an advantage that a seamless watertight structure can easily be achieved.

Moreover, in another embodiment in which the inner face bar is configured to be a long member continuous in the lengthwise direction of the existing conduit and a plurality of long members are assembled into a tubular form to construct a conduit repairing structure of the present invention, it is possible to achieve a conduit which is seamless in the lengthwise direction thus substantially increasing the flow capacity of the conduit. In such cases, inner face bars of a similar seize and shape with those used for the cylindrical conduit can be applied to special-shape conduits such as a horseshoe-shape conduit, a box culvert (rectangular conduit), or tunnels of various sectional shapes since the inner face bar is divided into a plurality of members in the circumferential direction of the existing conduit. Therefore, the inner face bars can easily be disposed depending on the sectional shape of a conduit thus improving workability.

Furthermore, in another embodiment, by configuring the reinforcing body such that a plurality of ring-like reinforcing members extending substantially along the inner periphery of the existing conduit are disposed at a predetermined interval in the lengthwise direction of the existing conduit, it is made possible to construct a conduit capable of resisting the increase of the exterior pressure. Also, by connecting and integrating the ring-like reinforcing members by means of connecting members to construct the conduit repairing structure of the present invention, a configuration in which a core is formed in the existing conduit is obtained thus significantly enhancing the structural strength of the conduit. Moreover, by adjusting the length of the connecting members between the ring-like reinforcing members so that the shape of the gap between the ring-like reinforcing members is a reversed V-shape, it is possible to cope with a bend of the existing conduit. Also by forming a reversed V-shape and a V-shape, it is possible to cope with a step in the conduit.

In another embodiment, it is possible to adopt a technique which utilizes the above described connecting members and comprises: circumferentially dividing a ring-like reinforcing member into three parts, assembling a partial reinforcing body, which is circumferentially divided into three parts and has a length capable of being easily carried into an existing conduit, from the divided parts and the connecting members outside the conduit, and carrying the partial reinforcing bodies into the conduit for assembly. This technique would make it possible to reduce the assembly time and, when applied to special-shape conduits, also improve workability since the sections which are difficult to assemble such as a corner section can be assembled outside the conduit.

In another embodiment, by reducing or eliminating the gap between the reinforcing body and the inner surface of the existing conduit with a space-infilling, it is made possible to prevent the reinforcing body from floating up due to the buoyant during the injection of the curable infilling by attaching the space-infilling on the top of the reinforcing body. Also attaching the space-infilling onto the side portion of the reinforcing body acts to restrict the vertical displacement of the reinforcing body by pressing itself against the inner surface of the existing conduit, thereby making the reinforcing body insusceptible to deformation.

In another embodiment, by disposing a tubular surface bar in an existing conduit in advance, it is made possible to prevent the curable infilling from flowing out of the conduit even when the damage of the existing conduit is severe, and also prevent the contact with underground water. Therefore, the properties of the curable infilling such as mortar will not deteriorate due to a situation of an existing conduit. Also by using a permeable material for the surface bar and a cement material including mortar for the curable infilling, it is made possible to discharge excessive water and air induced during the injection of the curable infilling out of the surface bar by filtration effect. Consequently, the cement material inside the surface bar becomes a compacted state and therefore insusceptible to underground water even before it is cured completely, thus ensuring high strength after curing.

Moreover, in another embodiment, by providing in the outer periphery of the reinforcing body with concavities and convexities continuous at least in the lengthwise direction of the existing conduit, a continuous gap is formed between the inner surface of the existing conduit and the reinforcing body, and thus it is made possible to reduce the resistance against the injection of a curable infilling such as mortar. Such formation of concavities and convexities is also effective in weight reducing of the reinforcing body.

Furthermore, in another embodiment, providing the reinforcing body with through holes in the lengthwise direction of the conduit is also effective in reducing the resistance against the injection of curable infilling as with the case described above and also in reducing the weight of the reinforcing body. Also by adopting such a reinforcing body to construct a repairing structure of the present invention, it is made possible to enhance the boding strength between the curable infilling and the reinforcing body through an anchor effect produced by the curable infilling cured in the reinforcing body and through holes thereof.

On one hand, configuring the inner face bar to be continuous in the lengthwise direction brings about an advantage that there are no seams in the lengthwise direction of the existing conduit thereby increasing the flow capacity of the conduit. Also configuring the fixing bar for securing the inner face bars onto the reinforcing body to be continuous in the lengthwise direction of the existing conduit has an advantage that the mounting strength of the inner face bars onto the reinforcing body is increased. But, in some situations where the repairing length of the existing conduit is increased, using the inner face bar and the fixing bar which are continuous in the lengthwise direction of the existing conduit will cause a problem in their transportation and manufacturing facilities. That is, upon manufacturing, typically the inner face bar or the fixing bar is taken up on a reel, but when their lengths exceed a certain limit, the diameter of the drum or reel will become too large after taking up them, thus causing problems such as storage spaces in the manufacturing site. Also, transporting these drums or reels will need a large vehicle that has difficulty in running on the ordinary driving lanes.

In such cases, the present invention provides a repairing structure for existing conduits which can solve the above described problems of manufacturing facilities and transportation while maintaining an equal effect as in the case of utilizing the inner face bars or fixing bars continuous in the lengthwise direction.

That is, a repairing structure for an existing conduit according to the present invention is characterized in that: a hollow skeleton-like reinforcing body extending substantially along the inner surface of the existing conduit is disposed in the existing conduit; a plurality of inner face bars are attached to the inside of the reinforcing body successively in the circumferential direction and the lengthwise direction of the existing conduit respectively to be assembled into a tubular form; the inner face bars adjoining to each other in the lengthwise direction are connected with their end faces being abutted against each other by means of an inner face bar connecting member which is placed over both of the adjoining inner face bars; and a curable infilling is provided to fill in between the inner face bar and the inner surface of the existing conduit.

In the present invention, it is possible to adopt a structure in which a plurality of fixing bars are attached to the inside of the reinforcing body in the lengthwise direction and the circumferential direction respectively, the above described inner face bars are attached to the reinforcing body via each of the fixing bars, and fixing bars adjoining to each other in the lengthwise direction of the existing conduit are connected together with their end faces being abutted against each other with a fixing bar connecting member which is placed over both fixing bars.

Also, in the present invention, it is possible to adopt a structure in which the above described inner face bar connecting members for connecting the inner face bars are arranged such that two of circumferentially adjacent members are displaced from each other in the lengthwise direction of the existing conduit.

Moreover, in the present invention, it is possible to adopt a structure in which the above described fixing bar connecting members for connecting the fixing bars adjoining to each other in the lengthwise direction of the existing conduit are arranged such that two of the circumferentially adjacent members are displaced from each other in the lengthwise direction of the existing conduit.

Furthermore, in the present invention, it is possible to adopt a structure in which the above described inner face bar connecting members and the fixing bar connecting members are displaced from each other.

Furthermore, in the present invention, it is possible to adopt a structure in which end faces of the above described inner face bars and/or fixing bars adjoining to each other in the lengthwise direction are integrated together by bonding.

Furthermore, in the present invention, it is preferable to adopt a structure in which a sealing material is interposed between the above described fixing bar and the inner face bar.

The present invention is addressed to achieve an intended purpose not by configuring the inner face bars to be continuous over the whole repairing length of the existing conduit as previously proposed, wherein the inner face bars are attached to the reinforcing body provided inside the existing conduit to be assembled into a tubular form as a whole, but by dividing the inner face bars into a plurality of parts in the lengthwise direction of the existing conduit and firmly connecting them together with their end faces abutted against each other.

That is, in one embodiment of the present invention, an inner face bar is divided into a plurality of members and end faces of these members are abutted to each other to connect them together by means of inner face bar connecting members which are disposed spanning over two adjacent members, thus raising the connection strength. In this configuration, the connected portion will not be deformed during the injection of a curable infilling or due to external (water) pressure or internal (water) pressure, and thus a reinforcing effect comparative to that of a single long member is achieved. Thus, it is made possible to use standard size members for the inner face bar, thereby solving the problems in manufacturing and transportation caused by longer members, and the ease of handling is also improved thus improving the workability in the field.

Similarly, a fixing bar is also divided into a plurality of members and end faces of these members are abutted against each other and connected together with fixing bar connecting members which are disposed over tow adjacent members. This configuration provides a reinforcing effect comparative to that of a single fixing bar, thus solving the problems with manufacturing and transportation as described above and, at the same time, provides the ease of handling thereby improving the workability in the field.

And, in another embodiment of the present invention, the positions at which the inner face bars are connected in the lengthwise direction with inner face bar connecting members are displaced for circumferentially adjacent ones so that the connecting positions of the inner face bars are not continuous in the circumferential direction. This offers an advantage that when a gap is produced in a connected portion of the inner face bars due to a tension on the repairing material in the lengthwise direction caused by, for example, an earthquake, the gap will not grow continuously in the circumferential direction and therefore the curable infilling will be resistant to fractures.

Also, in another embodiment, the positions at which the fixing bars are connected in the lengthwise direction with fixing members connecting member are displaced in the lengthwise direction for circumferentially adjacent pairs so that even when a gap is produced in a connected portion due to a tension applied on the repairing material in the lengthwise direction. This configuration provides an advantage that the curable infilling is insusceptible to cracks since the gap will not grow continuously in the circumferential direction.

Furthermore, in another embodiment, the inner face bar connecting members and the fixing bar connecting members are displaced from each other in the lengthwise direction so that either one of the connecting members exists circumferentially over the whole length of the conduit. This configuration makes it possible to enhance the effects of the present invention and prevent the curable infilling from flowing out onto the surface of the inner face bar during the injection of the curable infilling. Also, after the repairing material is formed, it is possible to prevent the fluid incoming from the inside and outside of the existing conduit flowing into or out of the inner face bar.

Furthermore, in another embodiment, the inner face bars and fixing bars, or the inner face bars or fixing bars are configured such that each portion in which end faces of adjacent members are abutted against each other is integrated by bonding, for example, with an adhesive or sealant. This configuration ensures the watertightness and connectivity of the connected portions of the inner face bars and/or fixing bars, thus further enhancing the above described effects.

Also by interposing a sealing material between the fixing bar and the inner face bar, it is possible to form a watertight structure between the inner face bar and the fixing bar. And particularly by adopting, at the same time, a configuration in which the positions of the inner face bar connecting members and the fixing bar connecting members are displaced from each other so that each inner face bar will be fitted into each fixing bar via a continuous sealing material at the connected portion of the inner face bar, it is made possible to secure a watertight structure at the connected portions of the inner face bars.

The grouting structure at an end part of the conduit repairing material of the present invention provides an end structure of the repairing material for injecting a grouting material into the gap formed between the inner surface of the existing conduit and the repairing material laid inside the conduit, characterized in that both ends of a tubular member made of a permeable material are fixed by pressure with a corresponding hollow diametrically-expansible member respectively to the inner surface of the longitudinal end part of the repairing material and the inner surface of the existing conduit at a position a predetermined distance outwardly away from the foregoing end part in the lengthwise direction, and that an injection opening for grouting material is provided in a near end part of the repairing material or in the above described tubular member.

In the present invention, it is preferable to adopt a structure in which a hollow resilient member is inserted either between both ends of the tubular member provided in the other end of the above described repairing material and the inner surface of the existing conduit or the repairing material, or between both ends of the tubular member and each hollow diametrically-expansible member.

The present invention is addressed to achieve an intended purpose by providing a structure in which the ends of the tubular gap formed between the existing conduit and the repairing material are sealed by fixing both ends of the tubular member made of a permeable material by pressure onto the inner surface of the existing conduit and the inner surface of the end part of the repairing material, instead of sealing up with a curable material such as mortar.

Thus, in the present invention, both ends of a tubular member made of a permeable material such as sailcloth made of textile such as woven fabric are fixed by pressure by means of a hollow diametrically-expansible member respectively onto the inner surface of the longitudinal end part of the repairing material and the inner surface of the existing conduit at a certain distance away from the foregoing end part outwardly in the lengthwise direction so that the tubular gap formed between the existing conduit and the repairing material is sealed up and a grouting material is injected through an injection opening provided in the inner surface of the repairing material near the sealed portion, or in the tubular member.

Accordingly, there will be no need for waiting until the curing is completed as in the case in which a curable material such as mortar is used for the sealing, and it is possible to start the injection of the grouting material right after applying sealing by means of the tubular member and to ensure stable sealing without being affected by the conditions of the inner surface of the existing conduit such as the existence of running water.

Moreover, by securely fixing each end of the tubular member by pressure to the inner surfaces of the existing conduit and the repairing material by use of a hollow diametrically-expansible member, it is also made possible to raise the injection pressure without leakage of grouting material through the sealing even in a high injection pressure and thereby reduce the time needed for the operation.

Moreover, the use of a tubular member made of a permeable material as the member for sealing makes it possible to discharge through the sealed portion excessive water and water incoming from the outside during the injection of the grouting material and prevent the formation of standing air. Thus the quality of the grouting material after injection is improved.

In the present invention, by placing a hollow resilient member on the outer periphery or inner periphery of each end of the tubular member instead of simply fixing by pressure each end of the tubular member onto the inner surface of the existing conduit and the inner surface of the repairing material, it is made possible to easily ensure the sealing at the portions of the tubular members fixed by pressure since the resilient member deforms conforming with the inner surfaces of the existing conduit and the repairing material even when there are concavities and convexities thereon. Thus, improvement of workability and upgrading of the injection pressure of the grouting material can be achieved.

Moreover, in another embodiment, it is possible to construct a structure in which, on one end of the repairing material, a grouting structure of the present invention described above is provided, and on the other end, another structure similar to the above described structure is provided in which each end of the tubular member made of a permeable material is fixed by pressure onto the inner surface of the end part of the repairing material and the inner surface of the existing conduit at a predetermined distance away therefrom in the lengthwise direction by use of a hollow diametrically-expansible member respectively. This structure makes it possible to discharge excessive water in the whole length of the injected grouting material and water intruded from outside, and to prevent the formation of standing air thus substantially improving the quality of the grouting material after injection.

Moreover, in the seal up structure on the above described end, by placing a hollow resilient member on the outer periphery or the inner periphery of each end of the tubular member, it is made possible to easily improve the sealing of the portion fixed by pressure, in which the tubular member is fixed by pressure onto the inner surface of the existing conduit and the inner surface of the repairing material by use of a hollow diametrically-expansible member, thus achieving the improvement of workability and further upgrading of the injection pressure of the grouting material.

BRIEF DESCRIPTION OF THE DRAWINGS

FIG. 13 shows a cross sectional view (A) and a enlarged view thereof (B) of an example in which the inner face bar 3 of the present invention is directly fitted into the reinforcing body 1.

BEST MODE FOR CARRYING OUT THE INVENTION

Figure 1:
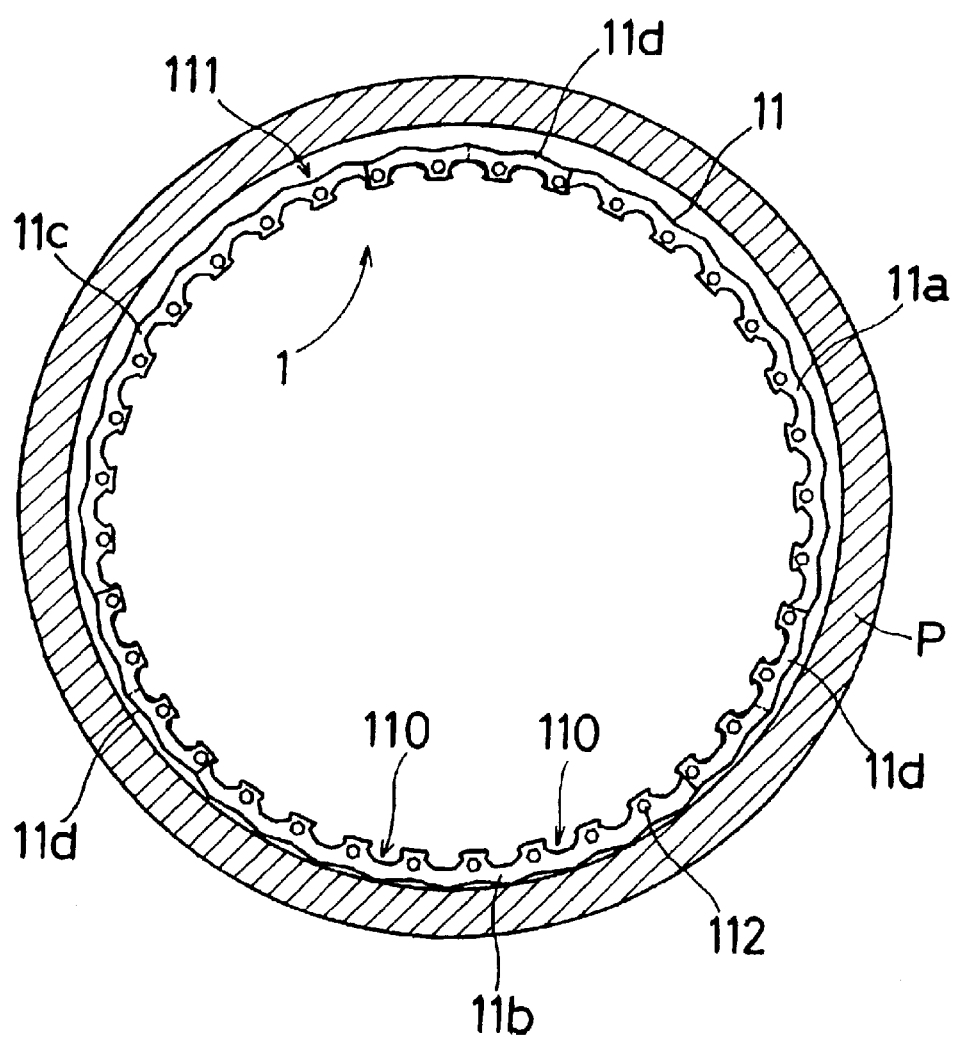
FIG. 1 is a cross sectional view to show a state in which a reinforcing body is assembled inside an existing conduit; the figure explains the installation process of an embodiment of the present invention.

Referring to the drawings, preferred embodiments of the present invention will be described in detail below, but the present invention will not be limited by these drawings.

First, a working environment suitable for human operation is prepared by a suitable method depending on the amount of sewage of the sewer pipe to be repaired. For example, sewage is held back by providing a plug in the upstream of the conduit to be repaired.

Figure 2:
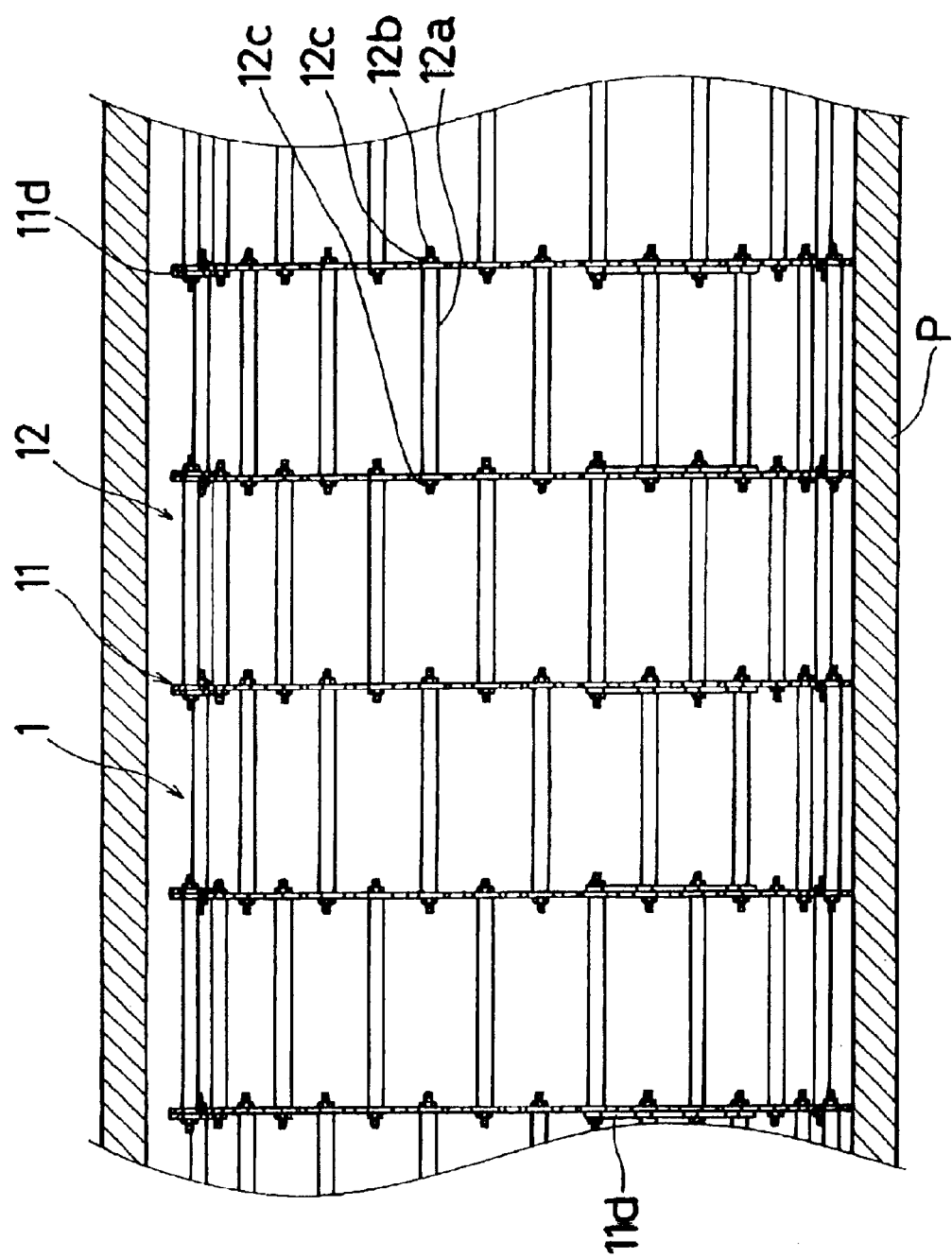
FIG. 2 is a longitudinal sectional view to show the state of FIG. 1.

Next, a plurality of ring-like reinforcing members 11 and a plurality of connecting members 12 for integrally connecting the reinforcing members spaced at a constant interval in the longitudinal direction of the existing conduit P are carried into the existing conduit P through a manhole (M1 and M2 in FIG. 29) and etc., to assemble them into a hollow skeleton-like reinforcing body 1 as shown by a sectional view of the existing conduit taken along the radial direction of the existing conduit (hereinafter a sectional view in this direction is referred to as a cross sectional view) in FIG. 1 and a sectional view of the same conduit taken in the longitudinal direction (hereinafter a sectional view in this direction is referred to as a longitudinal sectional view) in FIG. 2. In this case, the ring-like reinforcing members 11 and the connecting members 12 may be assembled on the ground into a size capable of being carried into the existing conduit P. This reinforcing body 1 has an outer shape extending substantially along the inner surface of the existing conduit P, and when the existing conduit P has a circular cross section as with this case, the outer shape of the reinforcing body 1 is configured to be circular. Also, the outer diameter of the reinforcing body 1 is configured to be slightly smaller than the inner diameter of the existing conduit P considering that the existing conduit may have steps or bends.

The ring-like reinforcing member 11 is, in this embodiment, formed by assembling three arcuate segments 11a, 11b, and 11c by means of connecting members 11d into a ring-like shape that extends as a whole substantially along the inner surface of the existing conduit P. The reinforcing member 11 is made of a high rigidity material, for example, steel, and may be surface treated to enhance its durability. Also, the arcuate segments 11a, 11b, 11c may be connected together by placing the ends of them overlapped without using the connecting members 11d.

In the inner periphery of each ring-like reinforcing member 11, are provided a plurality of concavities for fixing 110 evenly spaced in the circumferential direction into which a fixing bar 2 to be described later is fitted. Also in the outer surface of each ring-like reinforcing member 11, there are provided concavities and convexities 111, which are distributed continuously and uniformly in the circumferential direction, to facilitate the flow of uncured curable infilling, which is to be described later, in the lengthwise direction of the existing conduit when injecting the curable infilling. Each concavity for fixing 110 is configured to be wide at substantially central part in the depth direction, and narrower at its opening part. Moreover, each of the ring-like reinforcing member 11 is formed with through holes 112, each of which passes through in the lengthwise direction and is equally spaced in the circumferential direction.

The connecting member 12 comprises: a pipe member 12a which is disposed between a pair of ring-like reinforcing members adjacent in the longitudinal direction and acts as a spacer, a bolt 12b with male threads on both ends, and a nut 12c to be screwed in the male thread. The bolt 12b is inserted into a pipe member 12a disposed between adjacent ring-like reinforcing members 11 and, in that state, the male thread on each end of the bolt is inserted into a through hole 112 of a ring-like reinforcing member 11 respectively, and then a nut 12c is screwed on each end of the bolt to connect and integrate each ring-like reinforcing member 11 with each other. The number of through holes 112 of the ring-like reinforcing member 11 is made larger than the number of the bolts 12b inserted into the connecting members 12, and therefore there remain a plurality of through holes 112 unused on each ring-like reinforcing member 11 after the assembly of the reinforcing body 1.

Figure 3:
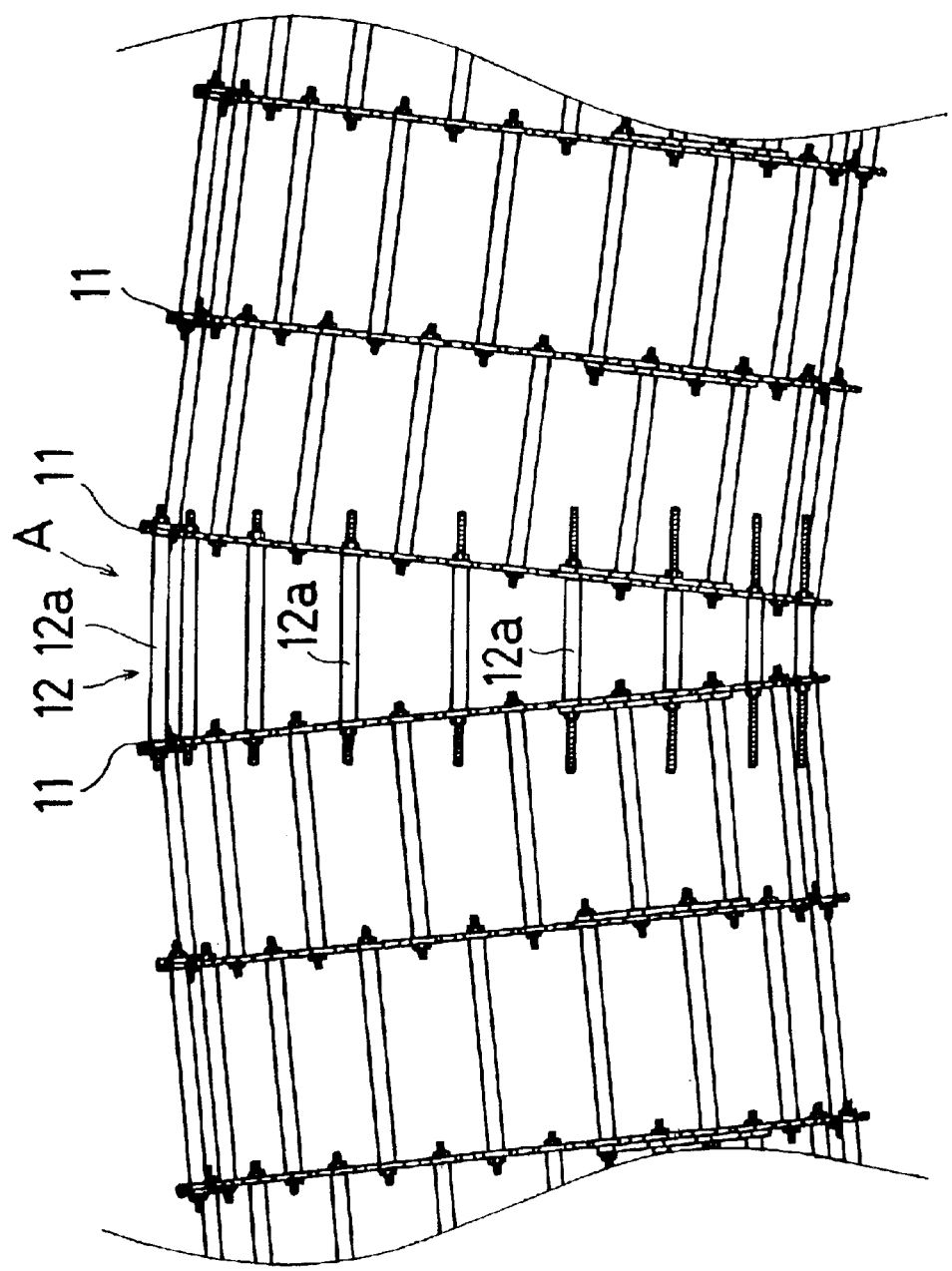
FIG. 3 is a schematic diagram to explain how to cope with a case in which there is a bend in the existing conduit P.
Figure 4:
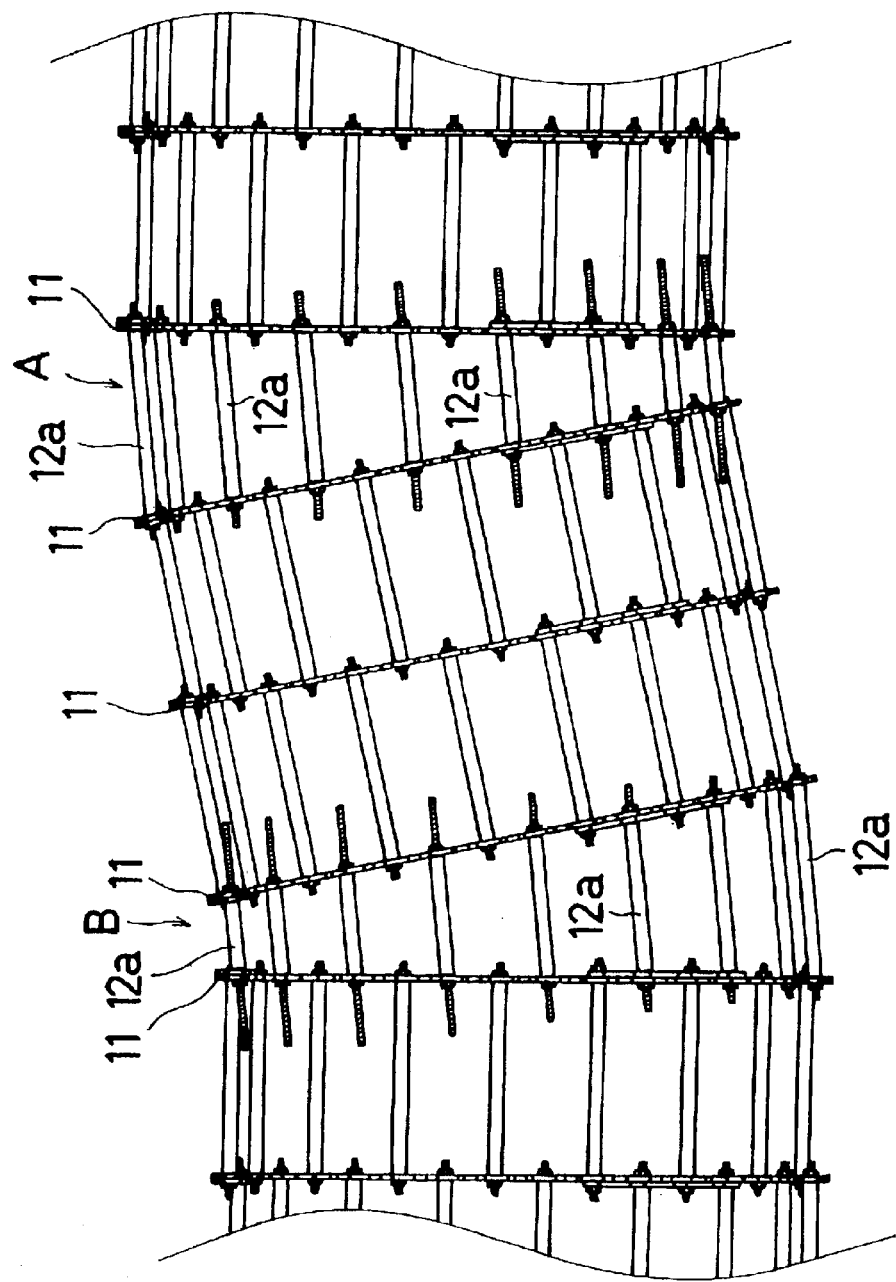
FIG. 4 is a schematic diagram to explain how to cope with a case in which there is a step in the existing conduit P.

When there is a bend in the existing conduit P, it is possible to cope with the situation by differentiating the lengths of the pipe members 12a located in the bend as shown in FIG. 3 to connect adjacent ring-like reinforcing members 11 in a reverse V-shape as indicated by A in the figure. Also when there is a step in the existing conduit P, it is possible to cope the situation, as exemplified in FIG. 4, by differentiating the lengths of the pipe members 12a in a similar fashion as described above to provide a connected portion in which the adjacent ring-like reinforcing members 11 are connected in a V-shape part as indicated by A in the figure and another connected portion of a reverse V-shape as indicated by B in the figure.

Figure 5:
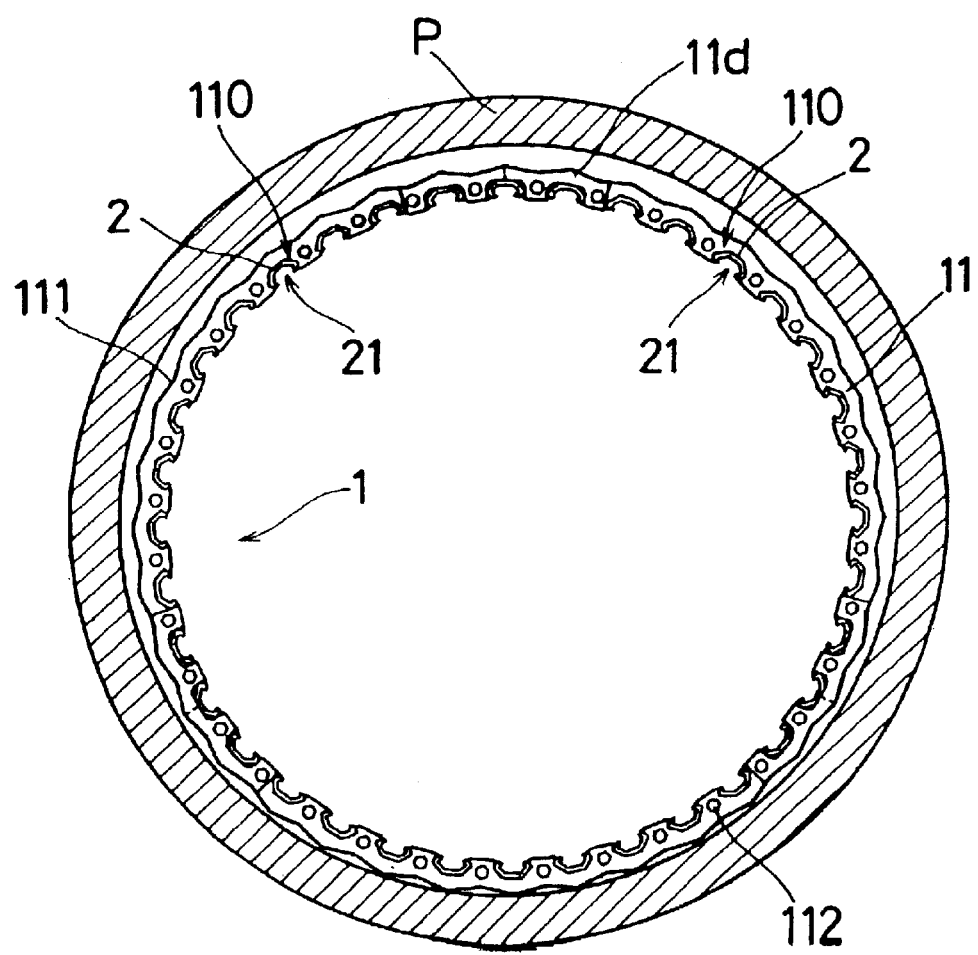
FIG. 5 is a cross sectional view to show a state in which a fixing bar 2 is attached to the inside of the reinforcing body 1; the figure explains the installation process of an embodiment of the present invention.
Figure 6:
FIG. 6 is a cross sectional view of a fixing bar 2 used in an embodiment of the present invention.

Next, as shown in FIG. 5, a plurality of fixing bars 2 are attached in parallel with each other to the inside of the hollow skeleton-like reinforcing body 1 along the lengthwise direction of the existing conduit P. Each of the fixing bars 2 is a long member with a uniform cross section, and the length may be as long as the distance between manholes in the existing conduit. The fixing bar 2 is mounted to the reinforcing body 1 by fitting the fixing bar 2 into each of the concavities for fixing 110 formed in the inner periphery of the ring-like reinforcing member 11. The fixing bar 2 has a cross section of a substantially uniform thickness as shown by a cross sectional view in FIG. 6, and an outer shape of an angular C shape similar to the outer shape of the concavity for fixing 110. The fixing bar 2 is attached to the reinforcing body 1 in such a way that the opening part 21 faces the inside of the reinforcing body 1 so that the opening part 21 matches to the opening part of the concavity for fixing 110. The fixing bar 2 may be made of a thermoplastic resin, heat-hardening resin, or the like as with the case of the inner face bar 3 to be described below.

Figure 7:
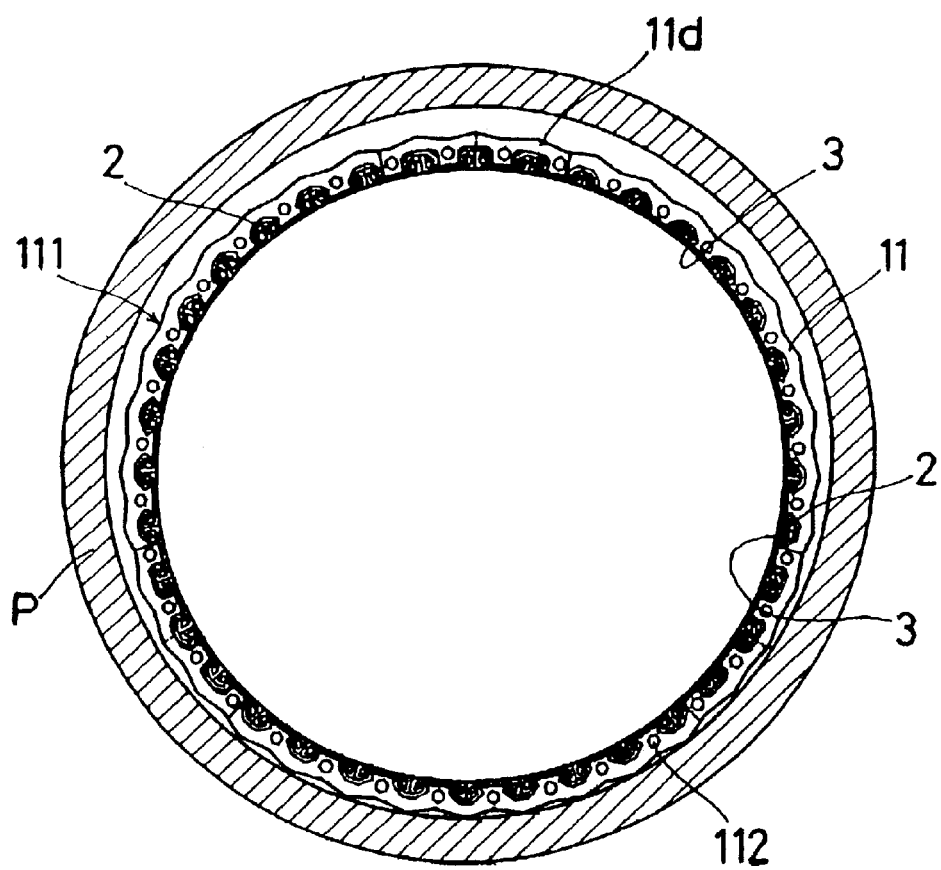
FIG. 7 is a cross sectional view to show a state in which an inner face bar 3 is attached to the inside of the reinforcing body 1; the figure explains the installation process of an embodiment of the present invention.
Figure 8:
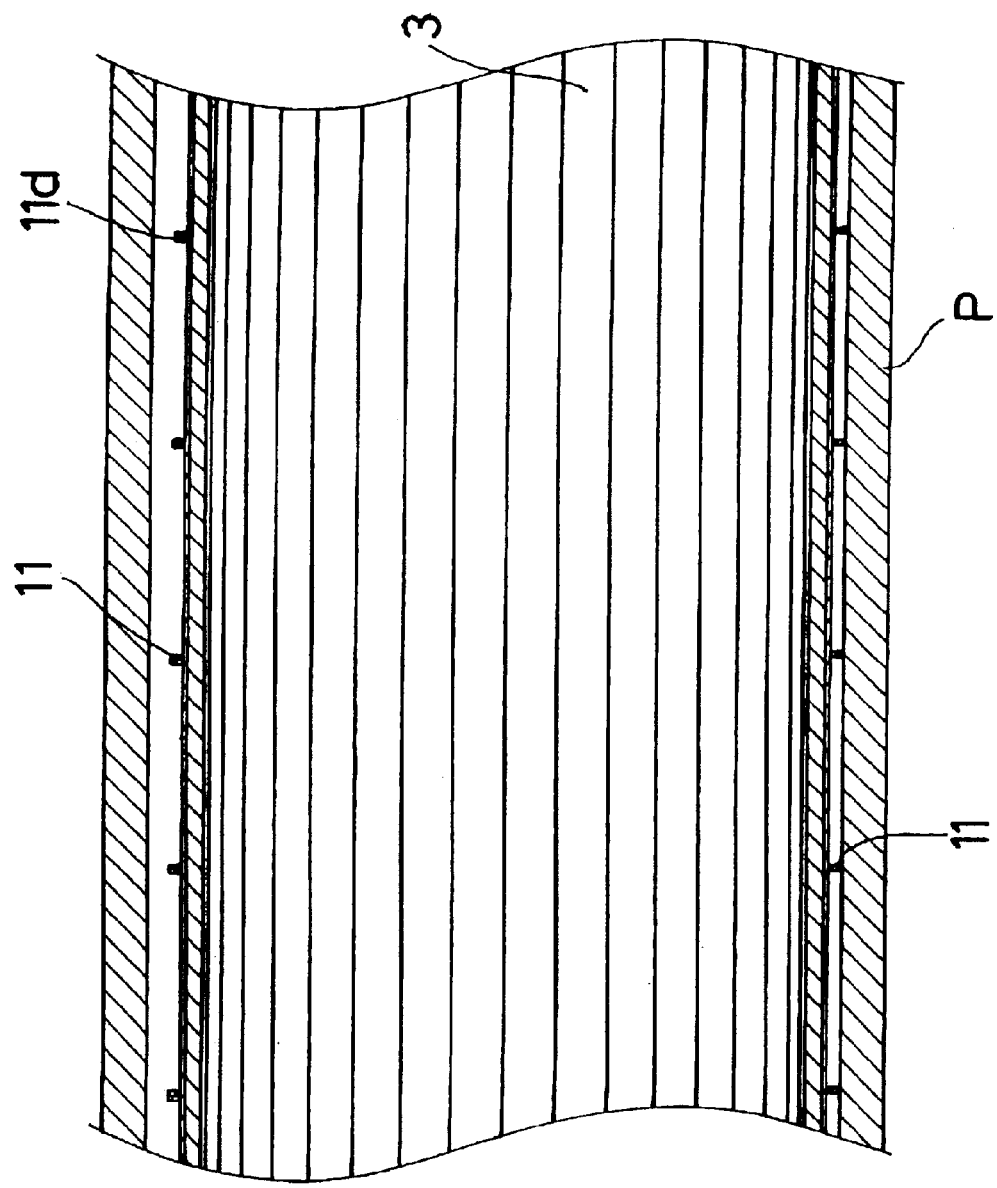
FIG. 8 is a longitudinal sectional view to show the state of FIG. 7.

As shown by a cross sectional view in FIG. 7 and a longitudinal sectional view in FIG. 8, the inner face bars 3 are attached to the inside of the reinforcing body 1 via each fixing bar 2. The inner face bar 3 of this example is a plate-like long member extending along the lengthwise direction of the existing conduit P, and may have a length, for example, equal to the distance between manholes in an existing conduit. Also its cross section is in bilateral symmetry as shown by an enlarged view in FIG. 9, and convexities for fixings 31a, 31b are integrally formed on both edges on one surface of the inner face bar.

The inner face bar 3 may be made of, for example, a thermoplastic resin including polystyrene resin for sewer pipes and olefin resins, a thermosetting resin including unsaturated polyester resins, or a fiber reinforced plastics such as GFRP and etc., or a metal including a stainless steel.

The distance between the convexities for fixing 31a, 31b of the inner face bar 3 is equaled to the distance between fixing bars attached in parallel with each other to the inside of the reinforcing body 1, and the inner face bar 3 is inserted into an opening part 21 of a fixing bar 2 respectively in a state that the convexity for fixing 31a of an inner face bar 3 abuts on the convexity for fixing 31b of another inner face bar 3. In this inserted state, the projecting end part of each convexity for fixing 31a, 31b is spaced wider than the width of the opening part 21 of the fixing bar 2, and therefore the inner face bars 3 are securely held in the reinforcing body 1 via the fixing bars 2.

Figure 10:
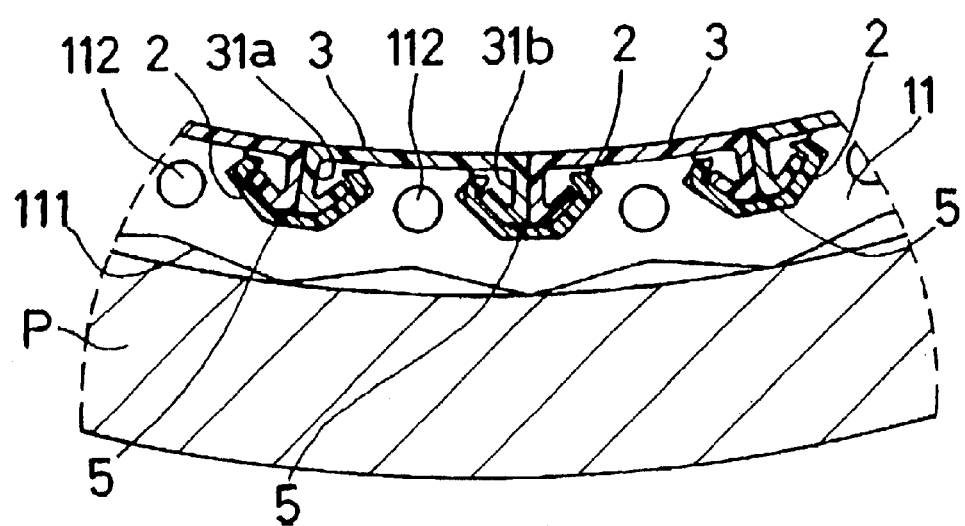
FIG. 10 is an enlarged sectional view to show a state in which a sealing material 5 is interposed between the inner face material 3 and the fixing bar 2 in an embodiment of the present invention.

The inner face bar 3 may be taken up on a reel and then, in that state, introduced inside the reinforcing body 1 in the existing conduit P through a manhole, thereafter being fitted into fixing bars 2. Also, to achieve watertightness between two adjacent inner face bars 3, it is preferable to interpose a sealing material 5 such as a synthetic rubber and water-swelling rubber between the top end surface of each convexity for fixing 31a, 31b of each inner face bar 3 and a fixing bar 2 as shown in an enlarged sectional view of FIG. 10.

Figure 11:
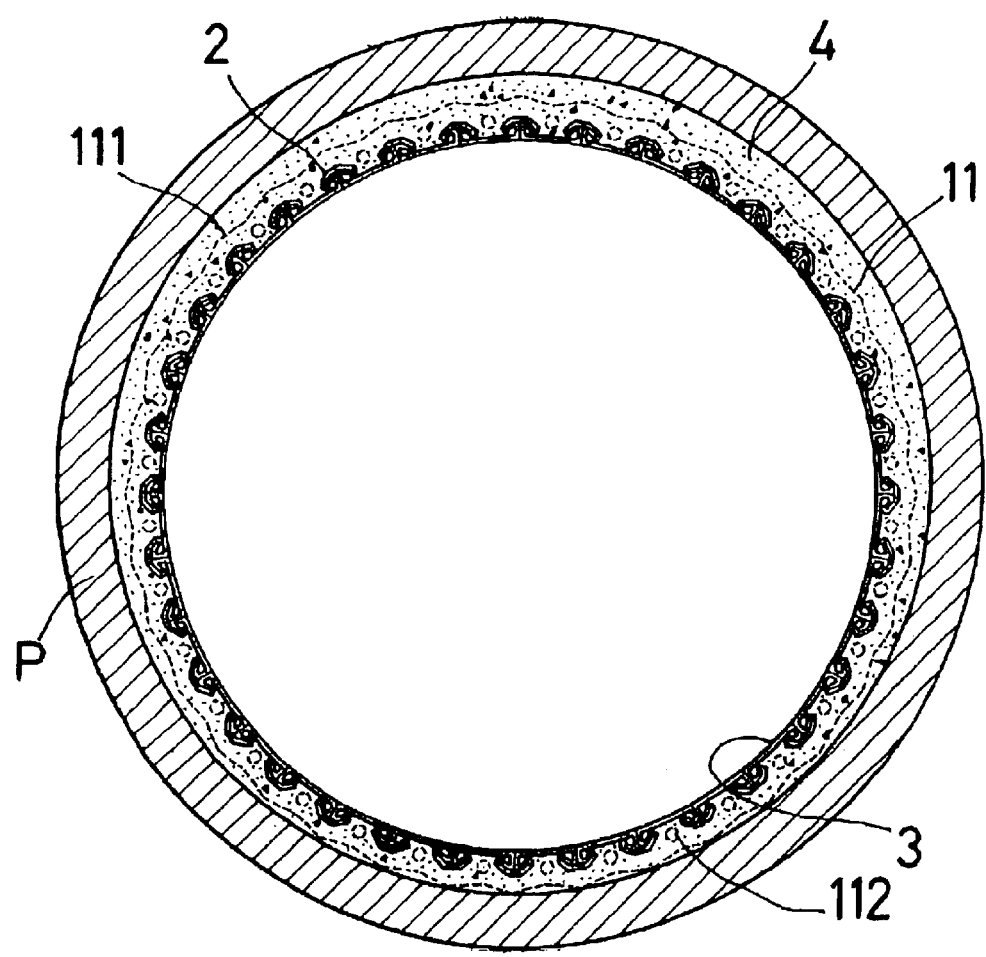
FIG. 11 is a cross sectional view to show a state in which a curable infilling 4 is being injected between the inner face bar 3 and the inner surface of the existing conduit P; the figure explains the installation process of an embodiment of the present invention.

Next, as shown in a cross sectional view of FIG. 11, a curable infilling 4 is injected between the existing conduit P and the inner face bar 3, and cured. As the curable infilling 4, a cement milk, a cement material such as a concrete, or a thermosetting resin such as unsaturated polyester resins and epoxy resins may be used, and a suitable one is selected depending on the required performance and cost. To perform this injection, a grouting structure, which is to be described later, is preferable, but other structures such as a framework provided at the end of the existing conduit may be used.

The points that should be specially noticed in the above described embodiments are: a hollow skeleton-like reinforcing body 1 is provided inside an existing conduit P, the skeleton body being formed by connecting and integrating a plurality of high rigidity ring-like reinforcing members 11 by means of connecting members 12 along the lengthwise direction of the existing conduit; and there is provided a curable infilling 4 filling up between the inner face bar 3 and the existing conduit P in a state that the inner face bars 3 are fitted to and supported by the reinforcing body 1 via the fixing bar 2. This configuration achieves a state in which a pipe of a reinforcing steel structure is built in the existing conduit P, thereby achieving a very high strength of the pipe after repairing. Also, since curable infilling 4 hardens in a state that it has flown into through holes 112 formed on the ring-like reinforcing member 11, the curable infilling 4 and the reinforcing body 1 are bonded more strongly by an anchor effect thus providing stable strength.

Moreover, even when an existing conduit P has a larger or smaller diameter than a specified value, it is possible to change the diameter of the ring-like reinforcing member 11 by utilizing the through holes 12. Furthermore, the use of the through holes 112 as well as the concavities and convexities 111 formed on the outer periphery of the ring-like reinforcing member 11 is effective in reducing the resistance in injecting the curable infilling 4 and also reducing the weight of the reinforcing body 1.

Moreover, in the above described embodiment of the present invention, since the inner face bar 3 is a strip-like member which is continuous in the lengthwise direction of the existing conduit P, the inner surface of the repaired conduit will have no seams in the lengthwise direction, and thereby the flow capacity of the conduit will be increased.

Figure 12:
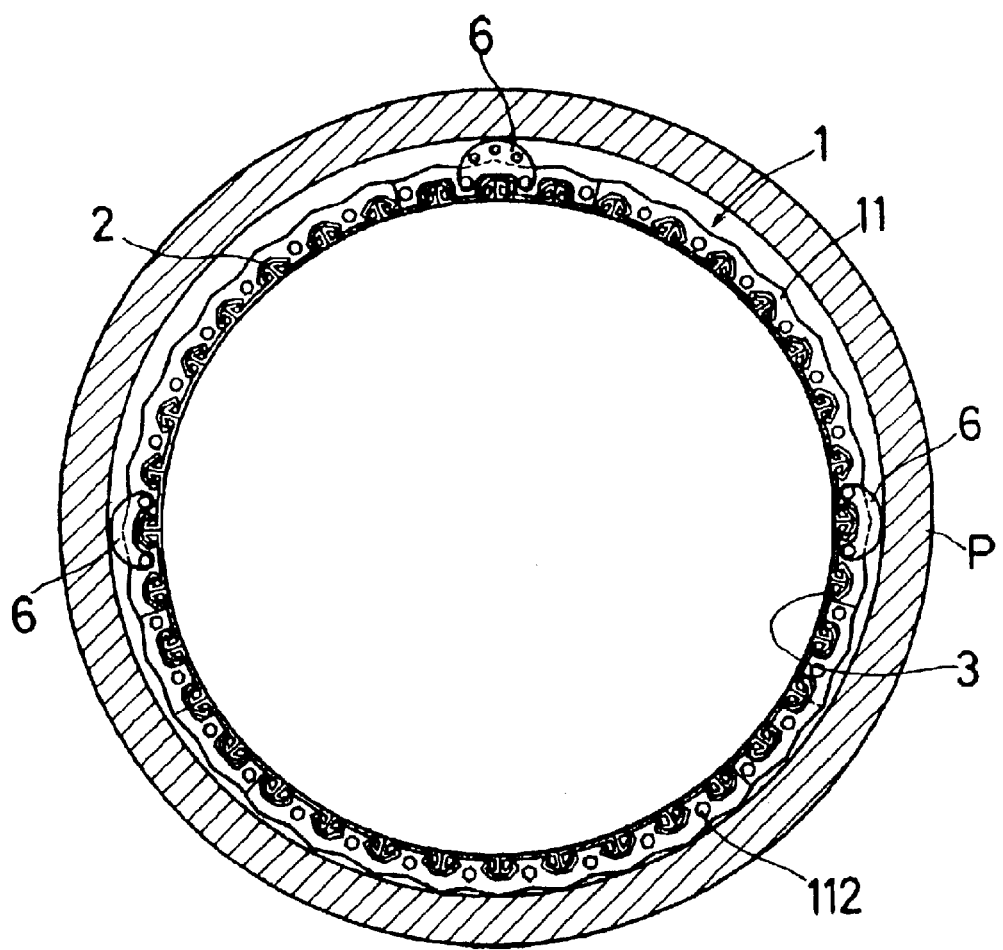
FIG. 12 is a cross sectional view to show a state in which a space-infilling 6 is attached to the reinforcing body 1 to prevent floating-up thereof; the figure explains an embodiment of the present invention.

In the above described embodiment, when the reinforcing body 1 can possibly be moved up upon injecting the curable infilling 4, it is possible to cope with that situation by mounting a space infilling 6 at the top of the reinforcing body 1 as shown in FIG. 12. Also to prevent the deformation of the reinforcing body 1 due to the exterior pressure, such space infilling 6 may be provided on the sides of the reinforcing body 1. This space infilling 6 provided on the side will make the reinforcing body 1 abut on the existing conduit P thus restricting the deformation of the reinforcing body when subjected to an outer force. The space infilling 6 can be secured by utilizing the through holes 112 of the ring-like reinforcing member 11 or in some other methods.

In the above described embodiment, an example of a configuration in which the inner face bar 3 is secured to the reinforcing body 1 via the fixing bar 2 is shown. However, it is also possible to adopt a configuration in which the inner face bar 3 is directly fitted into the concavity for fixing 110 formed on the reinforcing body 1; such an example is shown in FIG. 13(A) as a cross sectional view and as an enlarged view of the relevant part in FIG. 13(B). In this case, the sealing material 5 to provide watertightness between adjacent inner face bars 3 is preferably interposed between the contact surfaces of the inner face bars 3.

In the above described embodiment, an example in which the present invention is applied to an existing conduit with a circular cross section is shown, but the present invention can be equally applied to an existing conduit with an arbitrary cross section such as a horseshoe-shape conduit or a rectangular conduit (box culvert).

Figure 14:
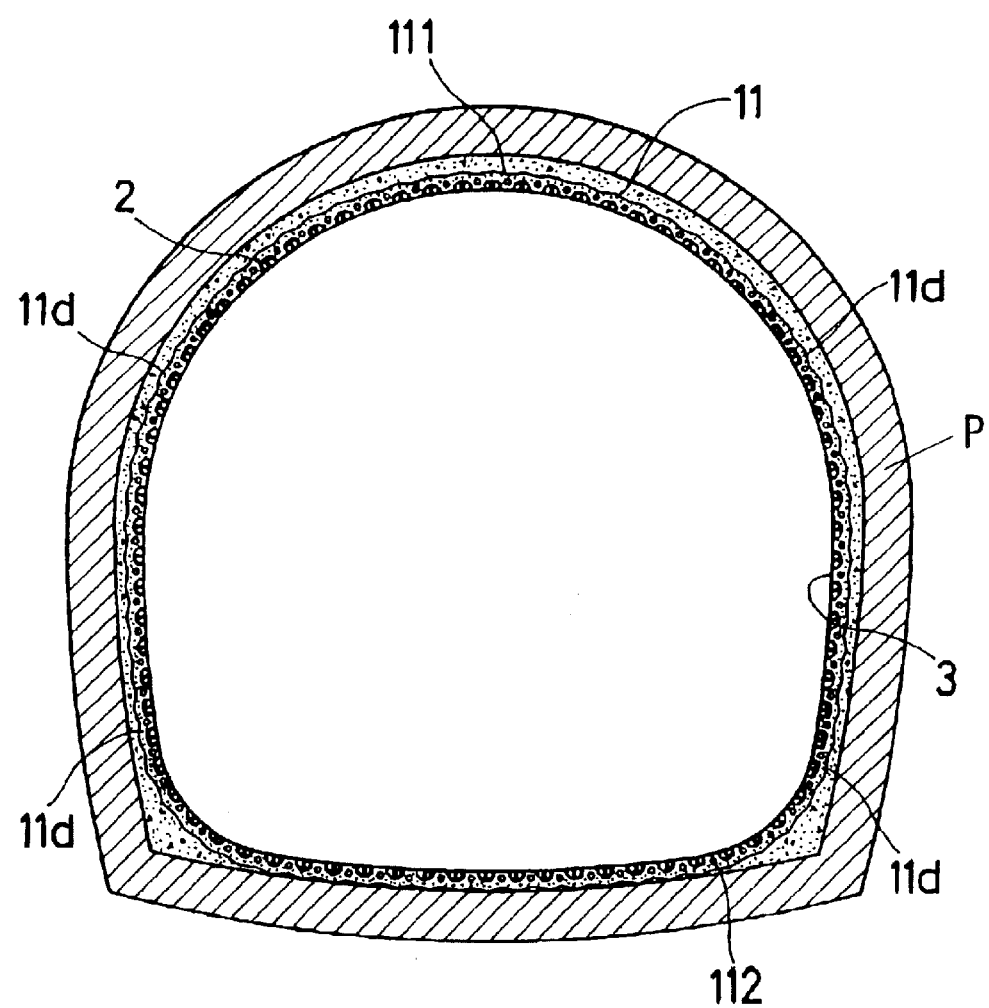
FIG. 14 is a cross sectional view to show a case in which the present invention is applied to a horseshoe-shape conduit.

FIG. 14 a cross sectional view to show a case in which the present invention is applied to a horseshoe-shape conduit. In the example of FIG. 14, almost same configuration as that of the embodiments shown in FIGS. 1 to 11 is utilized, and the shape of the segments forming the ring-like reinforcing member 11 of the reinforcing body 1 is suitably modified to comply with the shape of the special-shape conduit P' to be repaired. Then the segments are connected together with a connecting member 11d similar to that for the above described embodiment to form, as a whole, into a shape extending substantially along the inner surface of the special shape conduit P' to be repaired. Thus the present invention can be readily applied.

Figure 15:
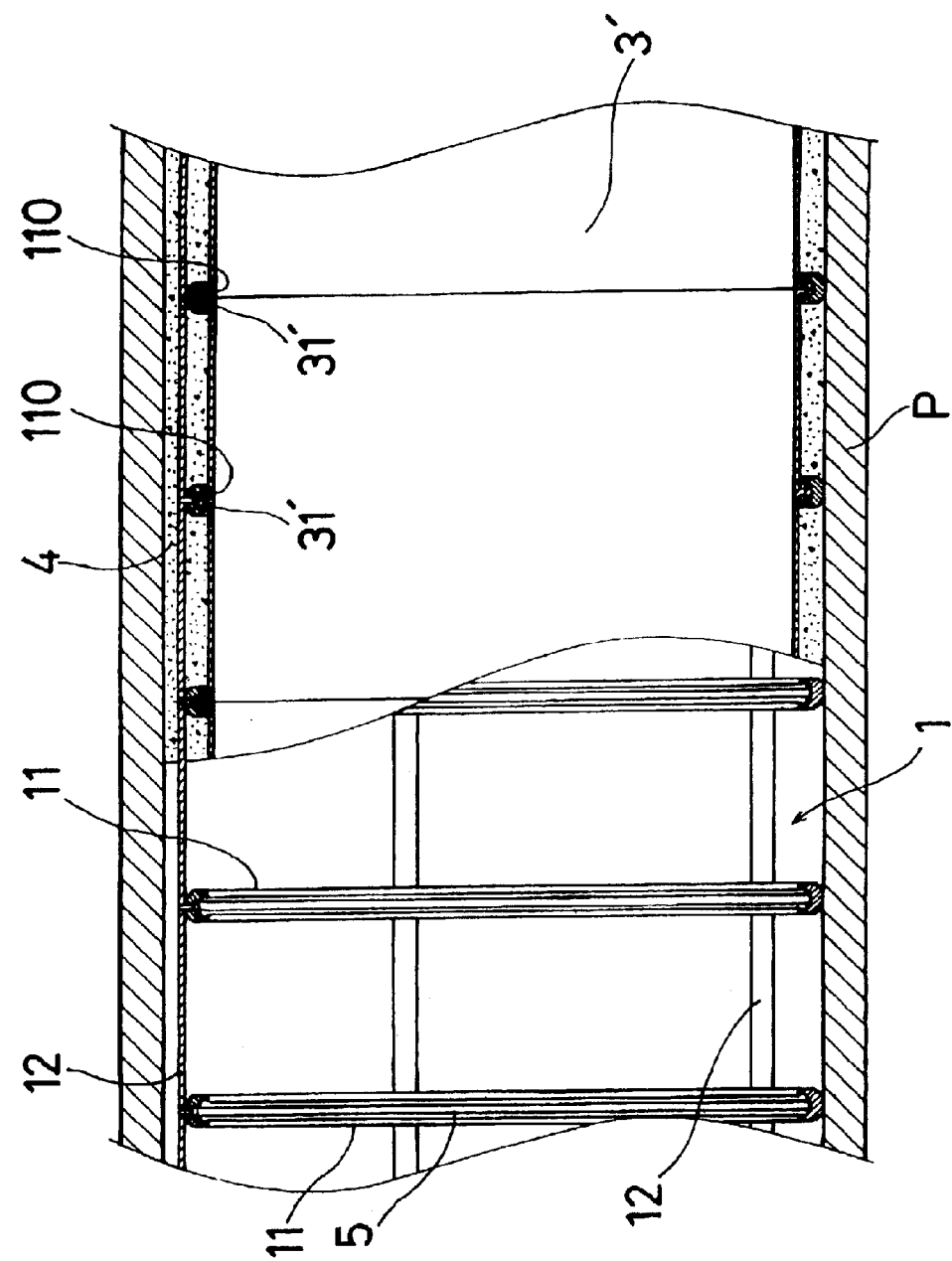
FIG. 15 is a schematic longitudinal sectional view to show another embodiment of the inner face bar of the present invention in which a tubular inner face bar 3' is utilized.
Figure 16:
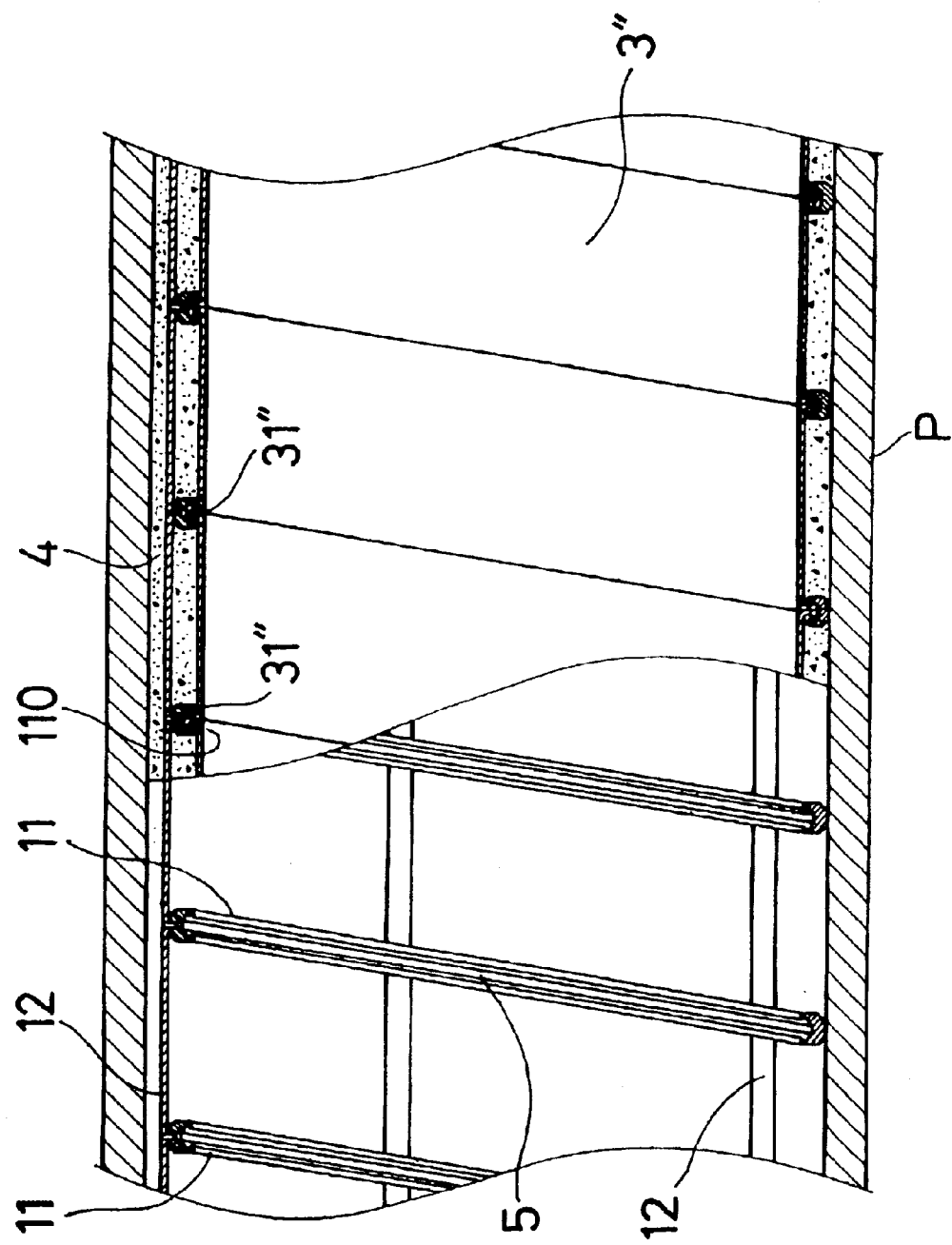
FIG. 16 is a schematic longitudinal sectional view to show still another embodiment of the inner face bar of the present invention in which a wide inner face bar 3" is wound into a spiral shape.

The inner face bar used in the present invention may be other than the type used in the above described embodiment, which is a long, planar inner face bar 3 provided in the existing conduit P along its lengthwise direction. Other examples may include a tubular inner face bar 3' extending substantially along the inner surface of the existing conduit P' and to be fitted to the reinforcing body 1 as schematically shown in FIG. 15, or an inner face bar 3" having a suitable width to be fitted spirally into the reinforcing body 1 as shown by a schematic longitudinal cross sectional view in FIG. 16.

When a tubular inner face bar 3' is used, the member is deformed into a U-shape to taken up on a reel, and thereafter is introduced into the reinforcing body 1 through a manhole from the ground. In this case, as shown in FIG. 15, it is preferable to divide the tubular inner face bar 3' into pieces of a suitable length in view of workability.

Also when using a tubular inner face bar 3' disposed along the circumferential direction, or an inner face bar 3" disposed spirally in the existing conduit, the concavities for fixing 110 inside the reinforcing body 1 are, as a matter of course, disposed in a circle or a spiral to fit the convexities for fixing 31' or 31", formed on the inner face bar 3' or 3". When using such inner face bars 3' or 3", it is also preferable to interpose a sealing material 5 in the abutting part of adjacent inner face bars.

Figure 9:
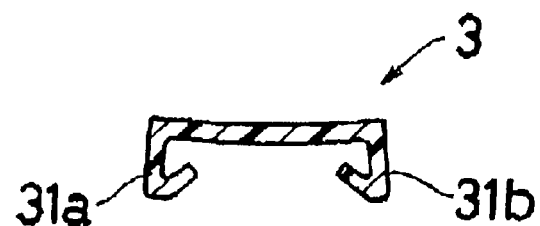
FIG. 9 is a cross sectional view of an inner face bar 3 used in an embodiment of the present invention.
Figure 17:
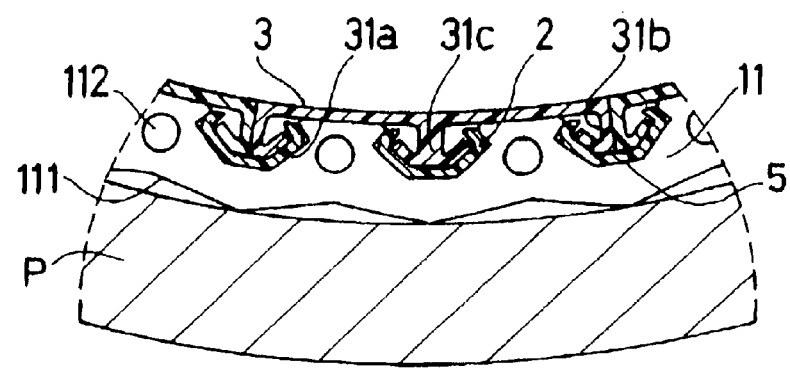
FIG. 17 is a cross sectional view to show another example of a convexity for fixing of the inner face bar 3 used in the present invention.

For any case in which a different form of the inner face bar is used, the position to form the convexity for fixing for the fitting with respect to the concavity for fixing of the reinforcing body or the fitting with respect to the fixing bar is not specifically limited and, as a matter of course, variations are possible. Taking a case in which a planar inner face bar 3 is disposed along the lengthwise direction of the existing conduit P for an example, convexities for fixing 31a, 31b may be provided on both side edges as shown in FIG. 9, and alternatively as shown by a cross sectional view of a fitted state in FIG. 17, symmetrical convexities for fixing 31a, 31b similar to the above described example are provided on both side edges and, in the middle thereof, a convexity for fixing 31c of a shape formed by combining two foregoing convexities, the middle convexity for fixing 31c being fitted individually into the concavity for fixing 110 of the fixing bar 2 or the reinforcing body 1.

Figure 18:
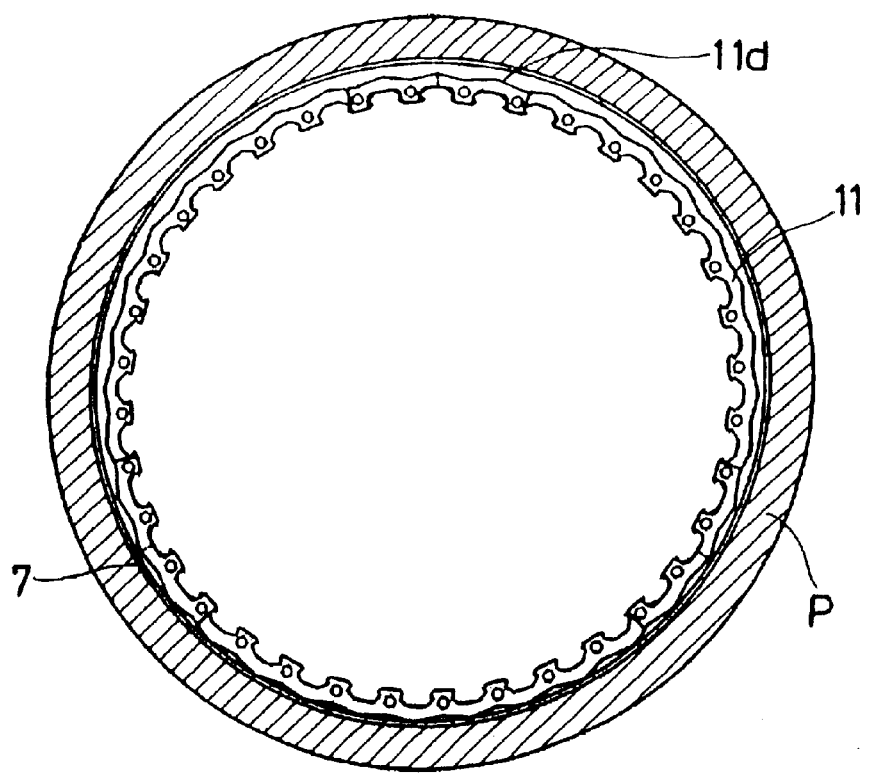
FIG. 18 is a cross sectional view to show an example of the present invention in which a surface bar 7 is utilized.

Also, in the above described embodiment, before assembling the reinforcing body 1, it is preferable to dispose a tubular surface bar 7 extending along the inner periphery of the existing conduit P as shown by a cross sectional view in FIG. 18. This surface bar 7 can prevent the curable infilling 4 from leaking out of the existing conduit and also prevent the performance degradation of the curable infilling 4 due to the contact with underground water. As the surface bar 7, for example, a fabric sheet or anti-water sheet is used and secured to the inner surface of the existing conduit P by a suitable securing method using a nail or adhesive. Uses of a permeable material such as a fabric sheet for the surface bar 7 and a cement material for the curable infilling 4 make it possible to discharge excessive water or air contained in the curable infilling 4 through the surface bar 7. Thus, it is possible to make the cement material to be in a compacted state, and therefore insusceptible to the effect of underground water even before it is completely cured, thus ensuring a high strength after curing.

Figure 19:
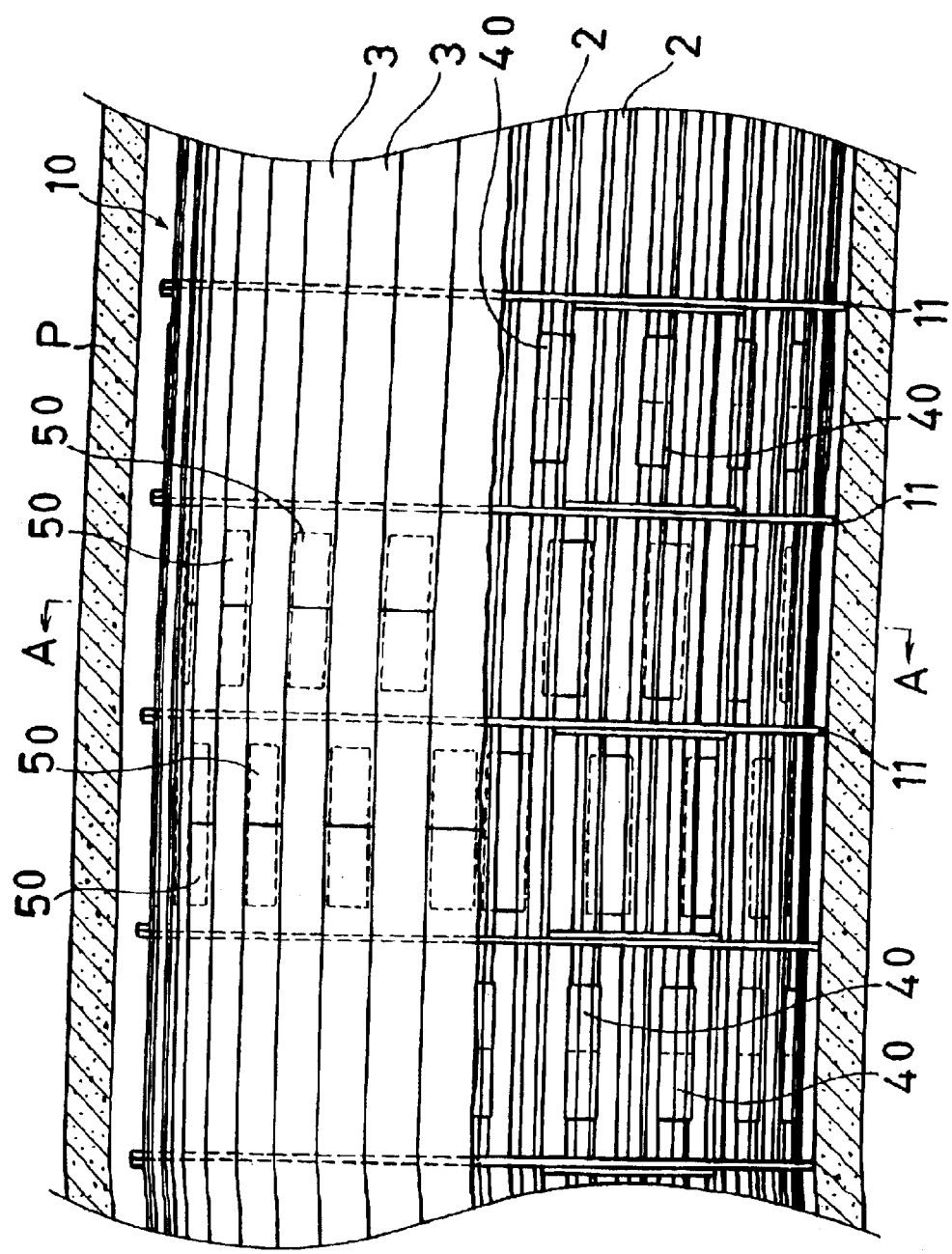
FIG. 19 is a sectional view to show a state before the curable infilling is injected, where the existing conduit P is sectioned by a vertical plane along the lengthwise direction, and the upper half of the repairing structure is sectioned by a vertical plane.
Figure 20:
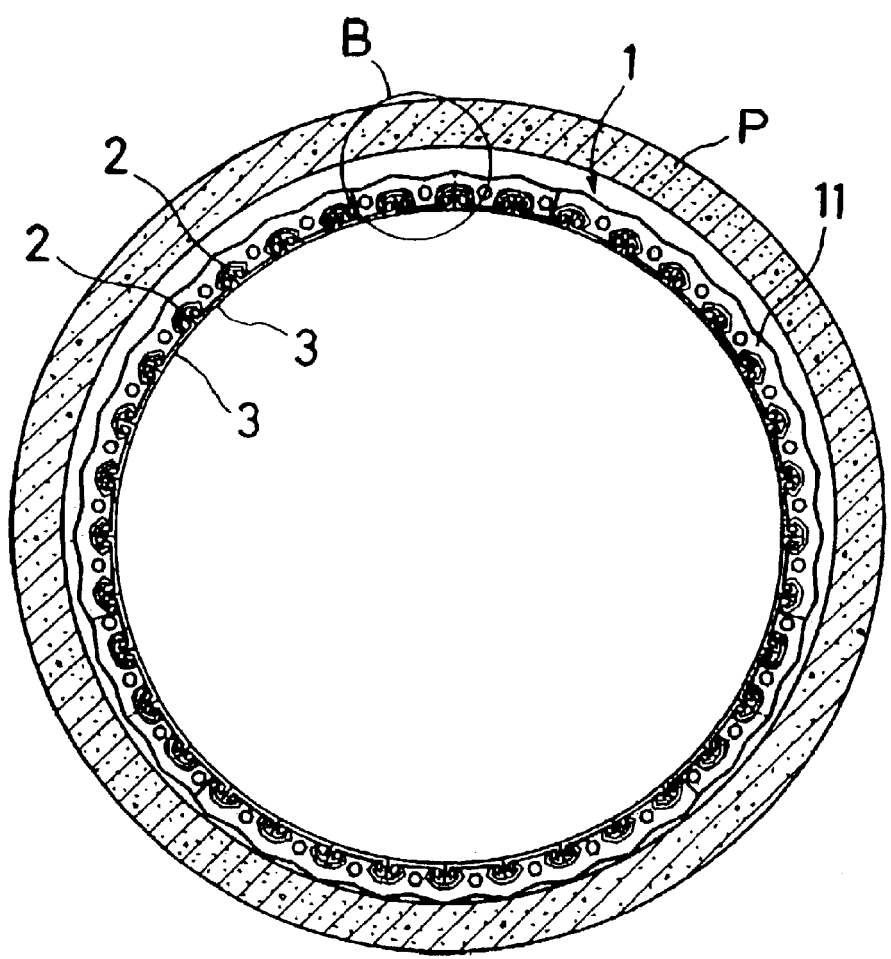
FIG. 20 is a sectional view taken in A—A line in FIG. 19.
Figure 21:
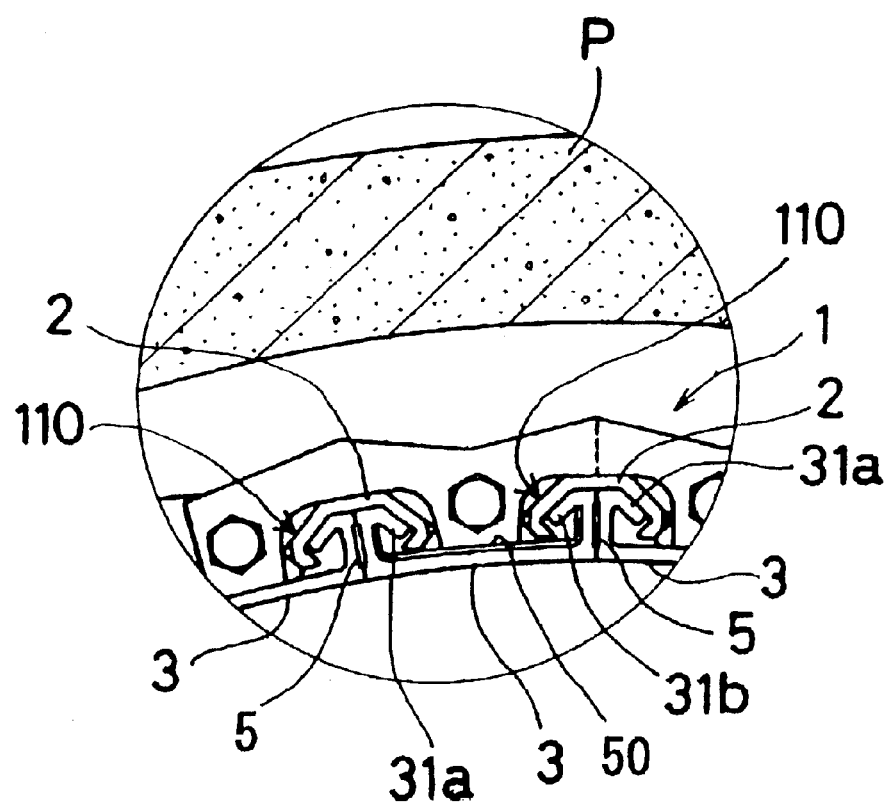
FIG. 21 is an enlarged view of part B of FIG. 20.

FIG. 19 is a sectional view to show a state before injecting the curable infilling; the figure explains the structure of an embodiment of the present invention. In the figure, the existing conduit P is shown sectioned by a vertical plane along the lengthwise direction, and the repairing structure is shown by sectioning its upper body by same vertical plane. Also FIG. 20 shows an A—A section of FIG. 19, and FIG. 21 shows an enlarged view of the part B in FIG. 20 respectively.

A hollow skeleton-like reinforcing body 1 is disposed in the existing conduit P and the inner face bar 3 is secured to the inside of the reinforcing body via the fixing bar 2, thereby forming a tubular repairing material extending along the existing conduit P as a whole.

Inside the hollow skeleton reinforcing body 1, a plurality of fixing bars 2 are attached in parallel with each other along the length of the existing conduit P. The fixing bar 2 is a molded part having a uniform cross section of angular C shape similar to that of the concavity for fixing 110 of the above described ring-like reinforcing member 11. The fixing bar 2 has, for example, a constant length of 5 m. Attachment of the fixing bars to the reinforcing body is performed by making the opening part shown by numeral 21 in FIG. 22 face inward and, in that state, fitting them into each concavity for fixing 110 of a plurality of ring-like reinforcing members 11 disposed in the lengthwise direction.

The above described fixing bar 2 having a constant length covers the repairing length with a plurality of members connected together in the lengthwise direction of the existing conduit P.

That is, the plurality of the fixing bars 2 are connected together by means of the fixing bar connecting member 40 with their end faces adjoining to each other in the lengthwise direction being abutted against each other, to make the whole length correspond to the repair length of existing conduit P, the whole body being secured to the reinforcing body 1.

Figure 22:
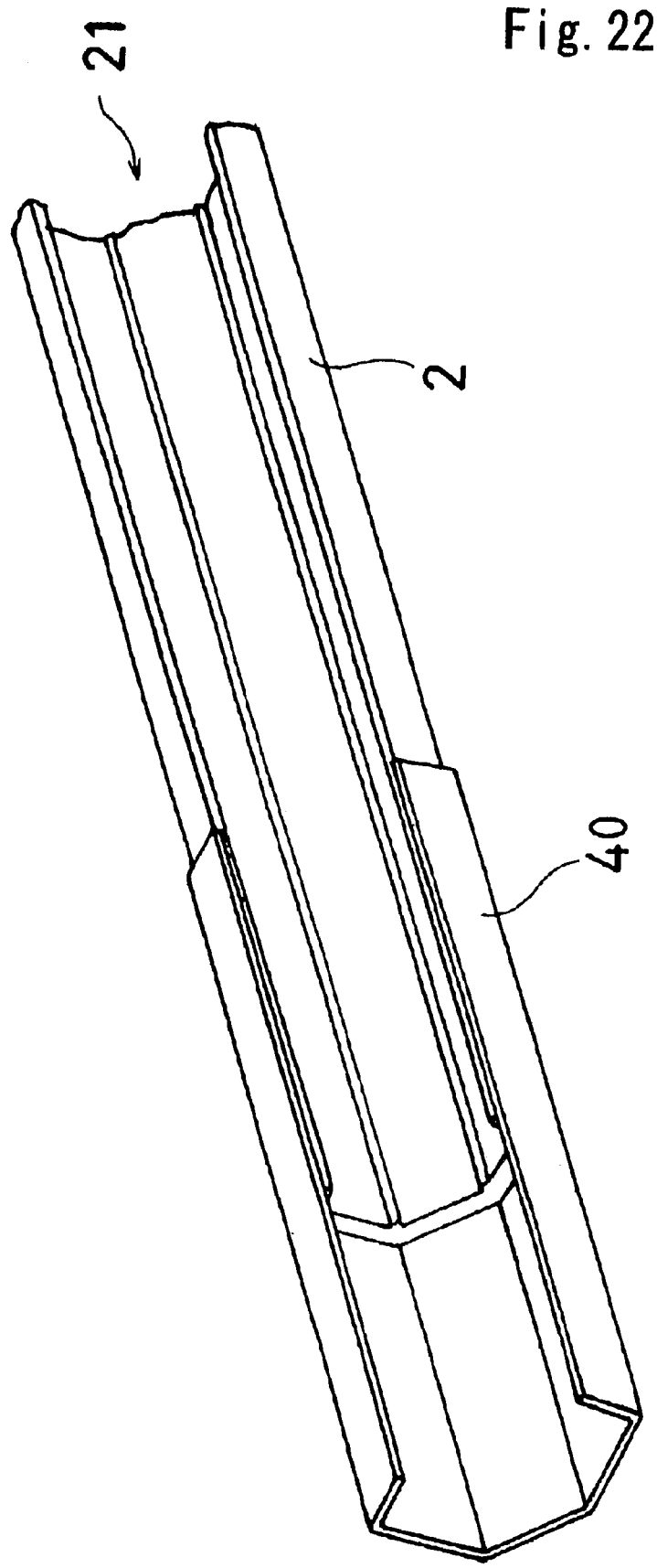
FIG. 22 is a perspective view to show a state in which a fixing bar connecting member 40 is attached to one end of the fixing bar 2 used in an embodiment of the present invention.

The fixing bar connecting member 40 is a member with an uniform cross section of a angular C shape into which the fixing bar 2 is fitted as shown in FIG. 22; its material may be a metal including stainless steel, a thermoplastic resin molding, heat-curable resin (including FRP) molding. Particularly, in the embodiment of the present invention, a material of high rigidity is preferably used. To connect two fixing bars together in the lengthwise direction with this fixing bar connecting member 40, one end of a fixing bar 2 is inserted inside the fixing bar connecting member to the half length of said connecting member 40, and one end of the other fixing bar 20 is inserted into the remaining half to make the end faces of both fixing bars 2 abut against each other. The abutment part is preferably formed of a complete water cutoff structure by integrating them together by use of an adhesive or sealing material, or a fusion bond.

Figure 23:
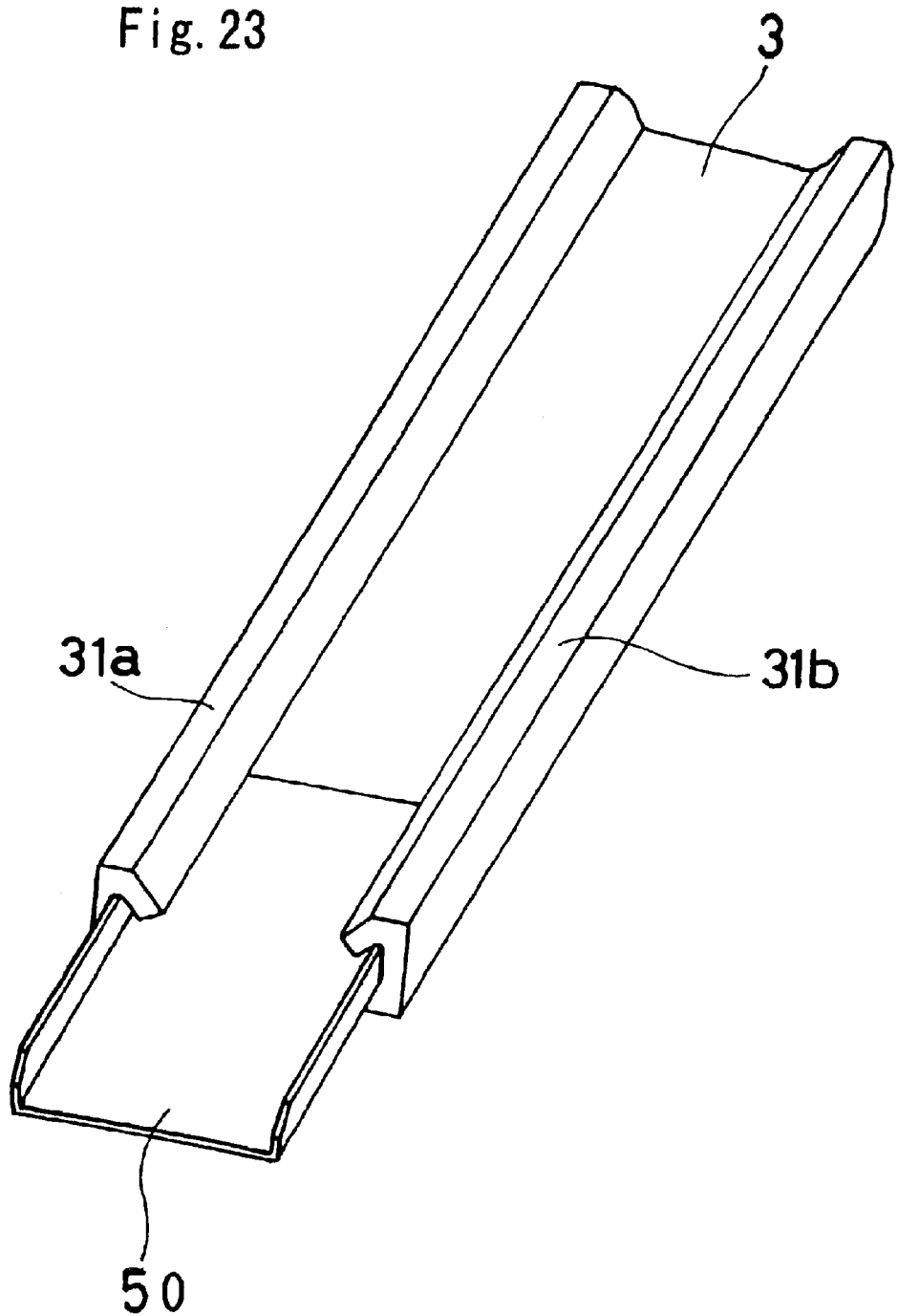
FIG. 23 is perspective view to show a state in which an inner face bar connecting member 50 is attached to one end of the inner face bar 3 used in an embodiment of the present invention.

As described so far, the inner face bars 3 are attached to a plurality of the fixing bars 2 connected to each other with fixing bar connecting members 40 in the lengthwise direction of the existing conduit P and attached to the inside of the reinforcing body 1 evenly spaced in its circumferential direction. The inner face bar 3 is, as a perspective view of FIG. 23 shows a state in which its end is inserted into an inner face bar connecting member 50 to be described later, a strip-like body having a bilaterally symmetrical, uniform cross section and a constant length of, for example, about 5 m. The inner face bar 3 has a cross sectional shape which is integrally formed with convexities for fixing 31a, 31b projecting to one side from both edges of the strip-like main body. The distance between the convexities for fixing 31a, 31b is equaled to the distance between the fixing bars 2 secured in parallel to the inside the reinforcing body 1. Adjacent inner face bars 3 are inserted into the opening part 21 of each fixing bar 2 in a state that a convexity for fixing 31a of one inner face bar 3 and a convexity for fixing 31b of the other inner face bar 3 are abutted against each other. In this inserted state, the projection tip part of each convexity for fixing 31a, 31b is spaced more widely than the width of the opening part 21 of the fixing bar 2, and therefore the inner face bars 3 are securely held by the reinforcing body 1 via the fixing bars 2.

Then, a plurality of inner face bars each of which having a constant length as described above are connected in the lengthwise direction of the existing conduit P to cover the repairing distance. That is, a plurality of inner face bars 3 are connected by means of inner face bar connecting members 50 in a state that their ends adjacent in the lengthwise direction are abutted against each other, into a length corresponding to the repair length of the existing conduit P as a whole. And the whole body is attached to the fixing bars 2 connected by means of fixing bar connecting members 40.

The inner face bar connecting member 50 has an uniform cross section of a U-shape as shown in FIG. 23, and is shaped so as to be fitted into the inside of the inner face bar 3. The inner face bar connecting member 50 may be composed of a metalworking product including a stainless steel part, a molded product of thermoplastic resin, or a molded product of thermosetting resin (including FRP). In an embodiment of the present invention, a rigid part is preferably used. To connect two inner face bars 3 by means of this inner face bar connecting member 50 in the lengthwise direction, one half-length part of the inner face bar connecting member 50 is fitted to the inside of an end of one inner face bar 3 with the remaining half part being left outside, and to the remaining half part, an end of the other inner face bar 3 is inserted so that ends of the two inner face bars 3 are faced and abutted against each other. The abutting part of both ends is preferably configured to be a fully water-proof structure by using an adhesive or sealing material or by integrating them by means of fusion or the like as with the case of the above described fixing bar 2.

Next, an example of the method of installing each member described above in the existing conduit P will be described in detail.

First, upon installation, a work environment for an operator is prepared in an existing conduit by a suitable method such as providing a plug in the upstream of the existing conduit P. It is preferable, in view of workability, that the reinforcing body 1 is partially assembled to an extent that the sizes of the arcuate segments 11a, 11b, 11c and the connecting member 12 are within the limit to carry them into the existing conduit P from a manhole and the like. For example, the partial reinforcing bodies are formed by connecting three of arcuate segments 11a, 11b, 11c, each of which is a ⅓ part of the circumference, in the lengthwise direction by means of connecting members 12 without connecting them in the circumferential direction. Then the partial reinforcing bodies are carried successively into the existing conduit P and disposed from a reference position such as, for example, an end or a bend of the existing conduit P, to connect them in the circumferential and lengthwise directions obtaining a tubular reinforcing body 1 as a whole.

Figure 24:
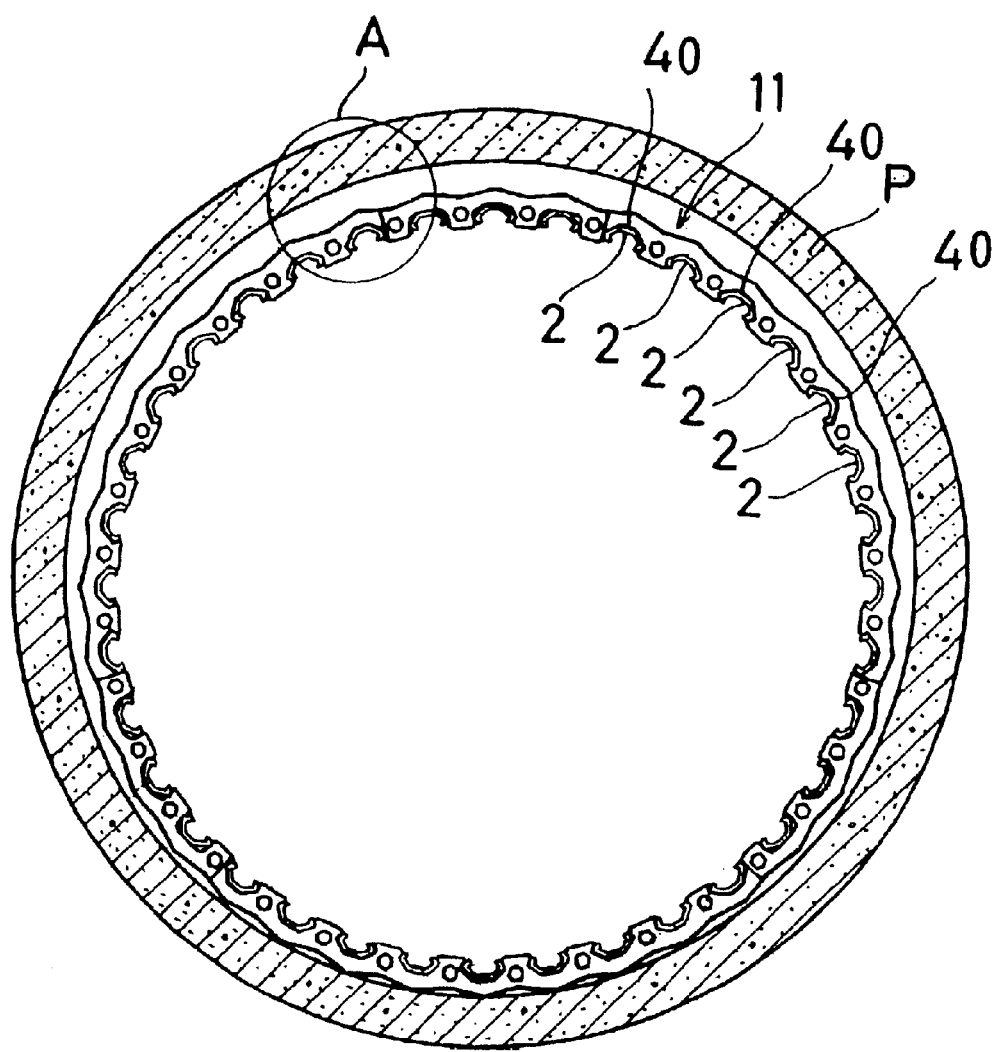
FIG. 24 is a sectional view sectioned by a plane perpendicular to the lengthwise direction of the existing conduit P to show a state of an embodiment of the present invention in which fixing bar 2 is fitted into each concavity for fixing 110 inside the reinforcing body 1 after the reinforcing body 1 is assembled.
Figure 25:
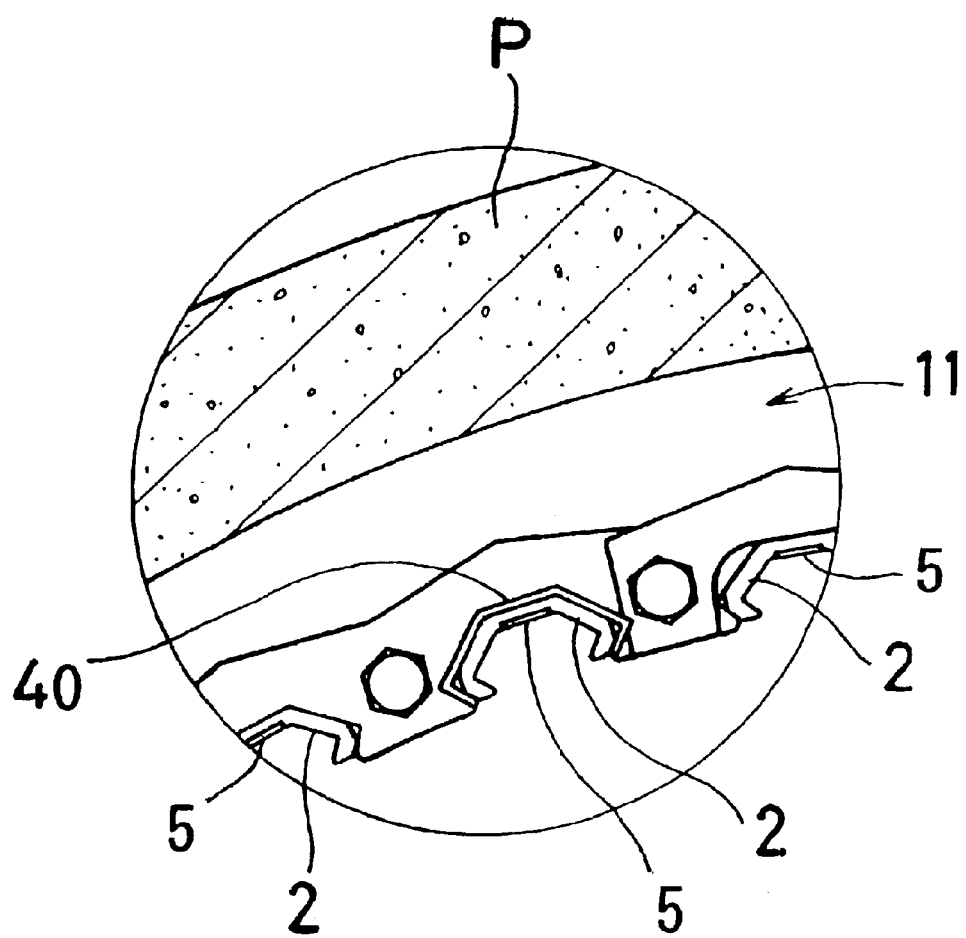
FIG. 25 is an enlarged view of part A of FIG. 24.

After completing the assembly of the reinforcing body 1, fixing bars 2 are fitted into each concavity for fixing 110 inside the reinforcing body 1 respectively. This state is shown by a sectional view in FIG. 24, and an enlarged view of the part A is shown in FIG. 24. Next, a pair of inner face bars 3 fitted into the fixing bar 2. These fixing bars 2 and the inner face bars are connected by means of the fixing bar connecting members 40 and the inner face bar connecting members 50 respectively by the above described method to form a continuous body in the lengthwise direction. Moreover, to achieve watertightness between the inner face bars 3 adjacent in the circumferential direction, it is preferable to place a sealing material 5 such as a synthetic rubber and water growth rubber between the fixing bar 2 and the tip part of each convexity for fixing 31a, 31b of the inner face bar 3 which is to be fitted therein. Further, as shown in FIG. 21, the sealing material 5 may be interposed between the side surfaces of the convexities for fixing 31a, 31b of each inner face bar 3.

Upon attaching the inner face bar 3, it is preferable to arrange such that the inner face bar connecting members 50 will not be aligned in the circumferential direction. That is, as shown in FIG. 19, the connecting positions of the inner face bars 3 by means of the inner face bar connecting members 50 are displaced from each other in the lengthwise direction for circumferentially adjacent pairs. By this configuration, even if a gap is produced at the connected portion of the inner face bars 3 when tension is applied on the inner face bar 3 in the lengthwise direction of the existing conduit P due to, for example, an earthquake, the gap will not grow into a continuous one in the lengthwise direction of the existing conduit P, and thus the structure is stabilized.

As shown in FIG. 19 as well, in attaching the fixing bar 2, it is preferable to arrange such that the fixing bar connecting members 40 are not aligned in the circumferential direction. By arranging the connecting positions of the fixing bars by means of the fixing bar connecting members 40 to be displaced in the lengthwise direction for circumferentially adjacent pairs, even if a gap is produced at the connected portion of the fixing bars 2 when tension is applied, similarly to the above described case, on the inner face bar 3 in the lengthwise direction of the existing conduit P due to, for example, an earthquake, the gap will not grow into a continuous one in the lengthwise direction of the existing conduit P and therefore the structure will be stabilized.

Furthermore, as shown in FIG. 19, by displacing the relative positions of the fixing bar connecting member 40 and the inner face bar connecting member 5, it is possible to prevent the curable infilling from leaking out onto the surface of the inner face bar when injecting the curable infilling into between the inner face bar 3 and the existing conduit P as will be described later. Also even after installing the repairing material, it is possible to prevent the fluid incoming from the inner and outer surfaces of the existing conduit P from flowing out of or into the inner face bars 3. Such effect is more securely achieved by placing a sealing material 5 between the tips of the convexities for fixing 31a, 31b of the inner face bar 3 and the fixing bar 2, or by adopting a configuration in which abutting ends at the connected portions of the inner face bars 2 the fixing bars 3 are integrated by means of an adhesive or the like. Then, in a state shown in FIGS. 19 and 20, a curable infilling is injected into between the inner face bar 3 and the existing conduit P and cured to fill in the gap.

The cross section shape of the fixing bar 2 used in the present invention is not limited to the angular C-shape as shown in the above described embodiment, but any shape may be adopted as long as the outer shape can be fitted into the reinforcing body 1 and the inner shape is such that a pair of inner face bars 3 can be fitted thereinto. Moreover, the shape of the fixing bar connecting member 30 is neither limited to the shape adopted in the above described embodiment, nor limited to be fitted into the outer surface of the fixing bar 2, and it may be attached to the inner surface. Furthermore, for example, a H-shape cross section configuration which covers both inner and outer surfaces of the inner face bar 3 may be adopted. However, when the shape and size of the convexities for fixing 31a, 31b of the inner face bar 3 are configured to be uniform and continuous in the lengthwise direction, a configuration in which the inner face bar 3 is mounted on only the outer surface of the fixing bar 2 is preferable.

Furthermore, the fixing bar 2 may not be used in the present invention; instead, the inner face bars 3 may be directly fitted and secured to the reinforcing body 1.

Furthermore, the cross section shape of the inner face bar 3 is not limited to the shape adopted in the above described embodiments, but any shape can be adopted as long as they can be fitted in a pair into the opening part 21 of the fixing bar 2, or into the concavity for fixing 110 when being directly fitted to the reinforcing body 1. Further, neither the cross section shape of the inner face bar connecting member 50 is limited to a U-shape as with the above described embodiment, nor its configuration is limited to one in which it is attached to the inside (between the convexities for fixing 31*a*, 31*b*) of the inner face bar, but configuration in which it is attached to the opposing surfaces may be adopted, and further a configuration of a H-shape cross section which covers both inner and outer surfaces of the inner face bar 3 may be adopted. However, in view of the prevention of obstruction of fluid flow in the conduit after forming the repairing material, it is preferable to adopt a configuration in which the inner face bar connecting member is attached only to the side of convexities for fixings 31*a*, 31*b* of the inner face bar 3 as with the above described embodiment.

Furthermore, although, in the above described embodiment, the fixing bars 2 and the inner face bars 3 are attached to the reinforcing body 1 after carrying in the partial reinforcing bodies into the existing conduit P to assemble them into a tubular hollow skeleton form, it is also possible to carry in the partial reinforcing bodies with the fixing bars 2 and the inner face bars 3 being attached thereto in advance. The term manhole in the present invention indicates not only one of a specified size but also one of a different size when the manhole is expanded in diameter to cope with the worksite situation or a pit is provided in the middle of the conduit.

Figure 26:
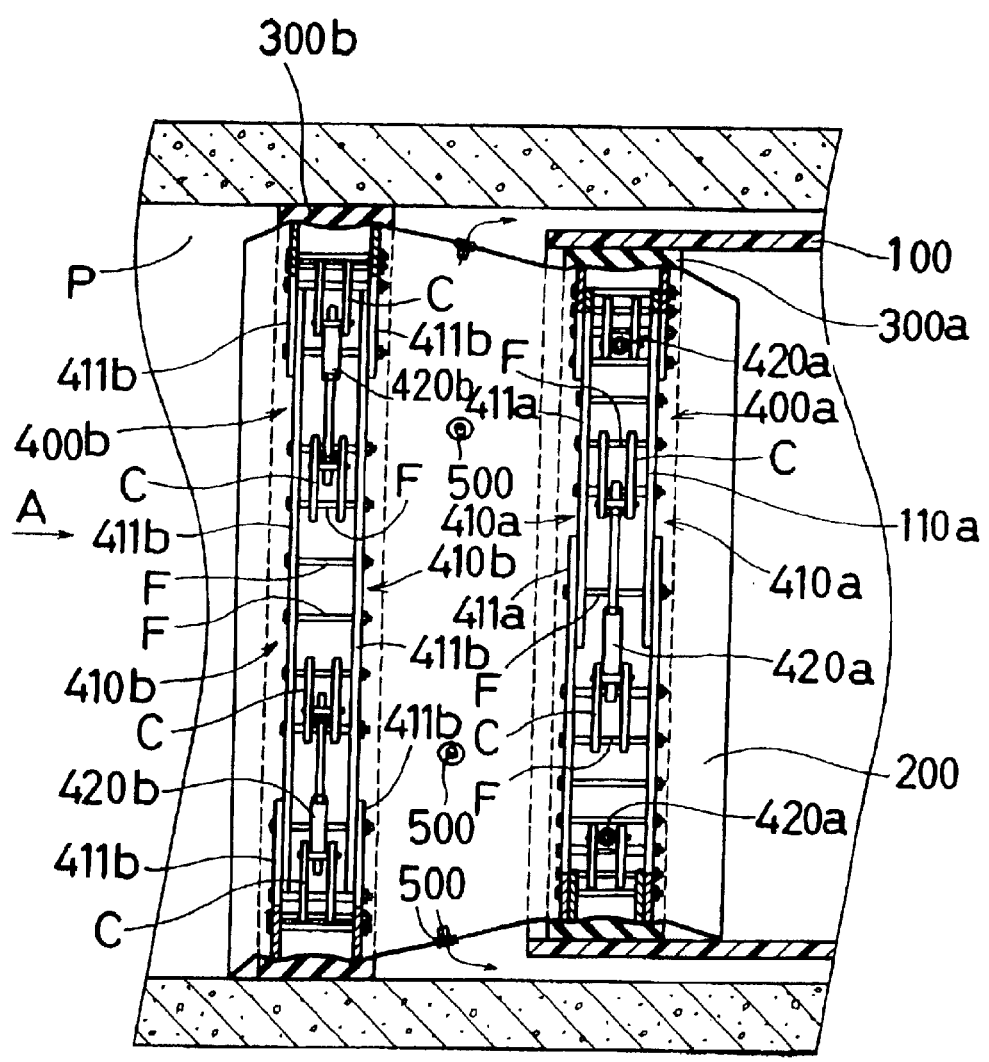
FIG. 26 is a sectional view to show a configuration near the end part of the repairing material of an embodiment of the present invention.
Figure 27:
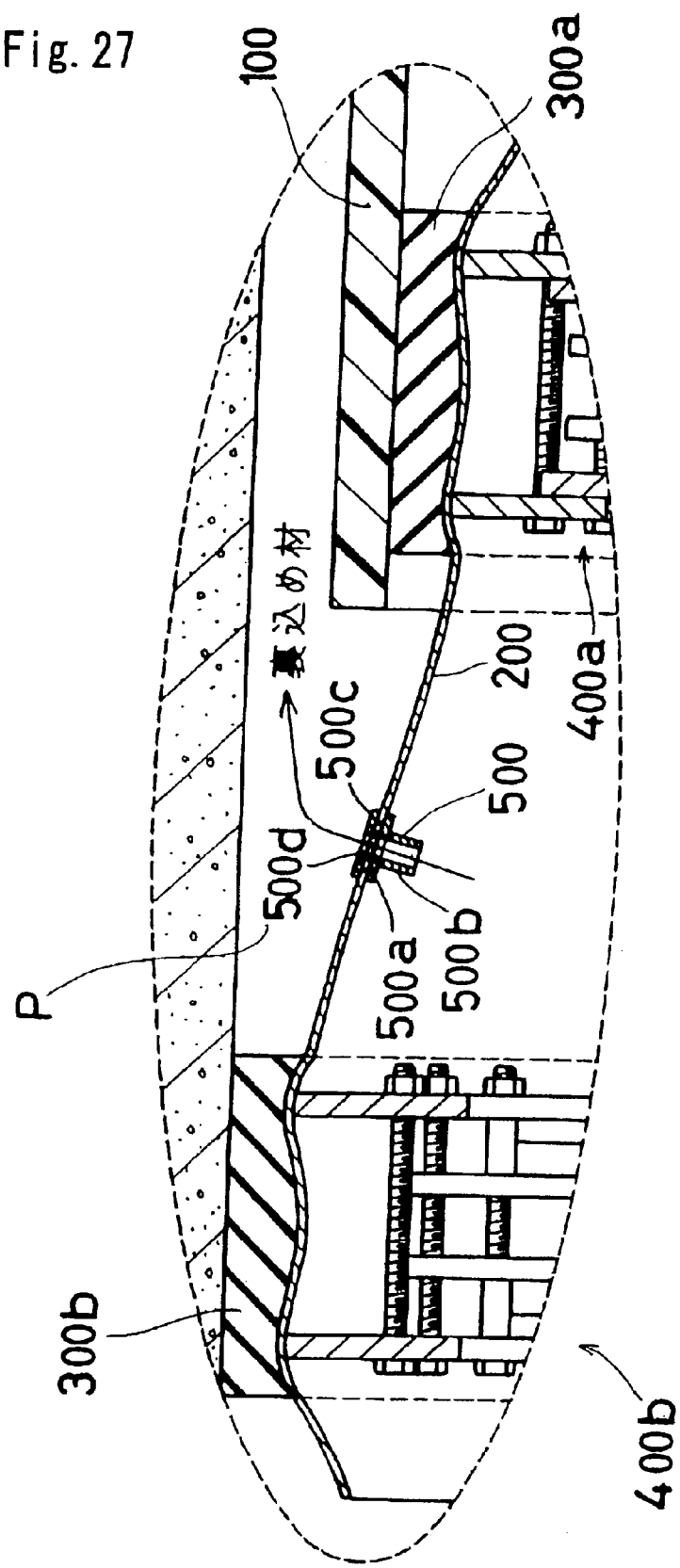
FIG. 27 is an enlarged view of FIG. 26.
Figure 28:
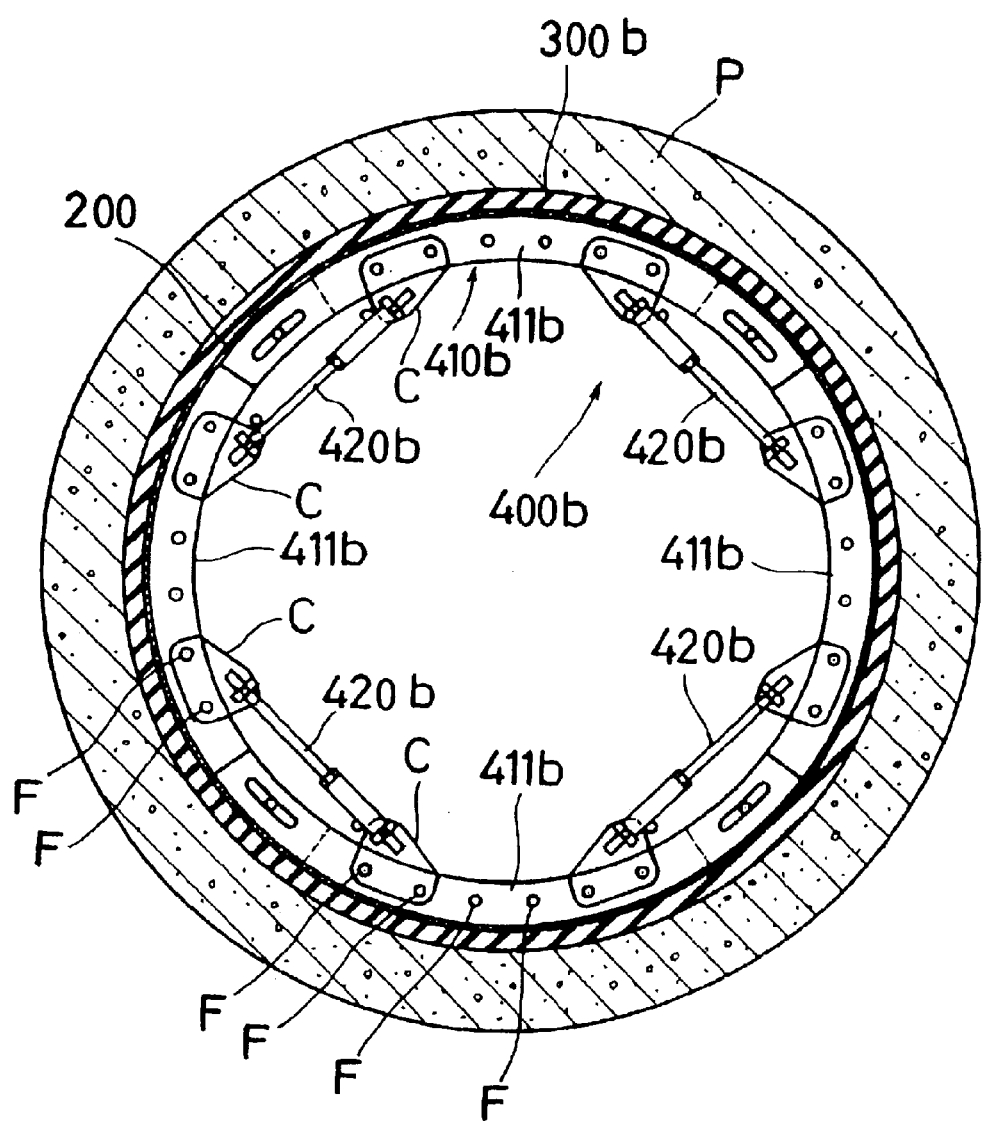
FIG. 28 is a view from arrow A in FIG. 26 in which the hollow diametrically-expansible member 400a is not shown.

FIG. 26 is a cross sectional view to show the configuration near the end of the repairing material 100 of the embodiment according to the present invention, and FIG. 27 is an enlarged view of the relevant part. FIG. 28 is a view in the direction of arrow A in FIG. 26; by way of simplification, the hollow diametrically-expansible members 400*a* located inside are not shown in FIG. 28.

Figure 29:
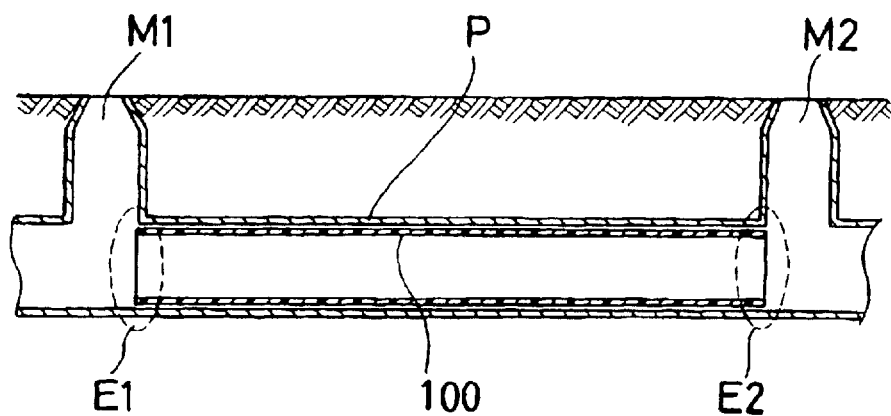
FIG. 29 is a schematic view to show the overall configuration of the existing conduit P and repairing material 100 to which an embodiment of the present invention is applied.

This embodiment shows an example in which the present invention is applied to an existing conduit P of a circular cross section; as schematically shown in FIG. 29, a repairing material 100 is installed in a tubular form inside the existing conduit P between the manholes M1 and M2. This repairing material 100 is formed by disposing a plurality of reinforcing bodies 1 made of steel or the like in parallel with each other along the inner surface of the existing conduit P, and connecting each reinforcing body 1 by means of the connecting member 12 in the lengthwise direction of the existing conduit P attaching the inner face bars 3 thereon. Each reinforcing body 1 is formed with suitable through holes 112 so that the injected curable infilling 4 can flow in the lengthwise direction.

One end of tubular member 200 of a permeable material is fixed by pressure onto the inner surface of one end of the repairing material 100 indicated by E1 in FIG. 29 along the circumferential direction, and the other end of this tubular member 200 is similarly fixed by pressure to the inner surface of the existing conduit P along the circumferential direction at a position of a predetermined distance outwardly away from the end of the repairing material 100 in the lengthwise direction. To be more specific about this configuration of fixing by pressure, hollow resilient members 300*a*, 300*b* are disposed along the inner surface of an end part of the repairing material 100 and the inner surface of the existing conduit P, and both ends of the tubular member 200 are disposed along the inner surface of each hollow resilient member 300*a*, 300*b* in the circumferential direction respectively. Further inside, hollow diametrically-expansible members 400*a*, 400*b* are disposed and the tubular member 200 is expanded in diameter from inside to be pressed against the inner surface of the repairing material 100 or the inner surface of the existing conduit P via the hollow resilient members 300*a*, 300*b*, and thereby fitting the tubular member 200 by pressure to these inner surfaces.

The tubular member 200 is made of canvas composed of cloth such as woven fabric and formed into a tubular shape by sewing; one end of which is matched to the inner perimeter of the repairing material 100 and the other end matched to the inner perimeter of the existing conduit P. For the tubular member 200, a canvas material and a sewing method to offer strength to withstand the injection pressure of the grouting material is chosen.

For the hollow resilient members 300*a*, 300*b*, closed-cell sponge rubber or others is used, and there is no specific limitation on the material for the hollow resilient members 300*a*, 300*b*, since they are temporal member to be removed after the injection and curing of the grouting material, and rubbers such as CR or urethanes are suitable. A Shore hardness of about 25A is preferable since it will provide sufficient flexibility for suitably complying with uneven spots of the inner surfaces of the repairing material 100 and the existing conduit P, and also sufficient rigidity for preventing deformation due to injection pressure of the grouting material by repulsing the compression by the diameter expansion members 400*a*, 400*b*.

The fabrication method of these hollow resilient members 300*a*, 300*b* is such that a block-like members are bonded at their ends with an adhesive or the like, and its outer shape conforms with the inner surfaces of the existing conduit P and the repairing material 100. The actual shape is selected to comply with the cross section shape of the conduit such that when the cross section shape of the existing conduit P is circular, a ring-like shape is selected, and a horseshoe shape for a horseshoe shape conduit. The thickness in the radial direction is preferably about 10 mm in view of obtaining suitable compression displacement. The diameter and width may be determined so as to comply with each working site.

The hollow diametrically-expansible members 400*a*, 400*b* have the same configuration to each other, in which steel rings 410*a*, 410*b* divided into a number of parts, and a plurality of jacks 420*a*, 420*b* are used. Referring to FIG. 28, this configuration will be explained taking the outer hollow diametrically-expansible member 400*b* for example. Each divided piece 411*b* forming the steel ring 410*b* is fitted to adjacent one to be slidable in the circumferential direction, and these pairs are connected to each other with the jacks 420*b*. The same is true for the inner hollow diametrically-expansible member 400*a*. In this example, each diametrically-expansible members 400*a*, 400*b* have a configuration in which tow pairs of steel rings 410*a*, 410*a* or 410*b*, 410*b* are disposed in parallel with each other in the lengthwise direction of the existing conduit P, corresponding divided pieces 411*a*, 411*a* or 411*b*, 411*b* are fixed to each other by means of a connecting member F such as a bolt. And each jack 420*a*, 420*b* is attached to the connecting members F respectively via engaging members C provided at both ends thereof, and the two steel rings 410*a*, 410*a*, or 410*b*, 410*b* are expanded in diameter by operating the jacks 420*a*, 420*b*.

As described so far, by configuring each hollow diametrically-expansible member 4001, 400*b* using 2 steel rings 410*a*, 410*a*, or 410*b*, 410*b* respectively, it is possible to readily install them at a right angle without making them slanted during the installation in the conduit. However, even when each hollow diametrically-expansible member 400a, 400b is formed by a set of steel ring 410a, 410b respectively, it is possible to achieve the same effect as that of the present embodiment by installing them exactly at a right angle in the conduit. The contours of the hollow diametrically-expansible members 400a, 400b are configured, as with the case of the hollow resilient members 300a, 300b, to conform with the shape of the existing conduit P, for example configured to be ring-like when applying for conduits with a circular cross section as with the present embodiment, and to be a horseshoe shape when applying for a horseshoe shape conduit. The hollow diametrically-expansible members 400a, 400b are not limited to the above described configurations, but for example, an inflation bag such as a tire inner tube may used to expand the tubular member 200 in diameter by injecting air into the bag.

The tubular member 200 is provided with a plurality of injection openings 500 for grouting material. These injection openings 500 of grouting material may be composed of any part that can be connected to the tip of the injection hose (not shown) of grouting material, and may be made of either metal or plastics. As the mounting structure to mount the injection opening 500 for grouting material to the tubular member 200, a structure shown in FIG. 27 is used in which the flange 500a is on one end formed with a long sleeve 500b on which a male thread is provided for connecting the hose via a conduit joint, and on the other end with a short sleeve 500d on which a female thread is provided for screwing the nut 500c. On one hand, the tubular member 200 is drilled with a hole, and the tubular member 200 is put between the nut 500c and the flange 500a by screwing the nut 500c onto the short sleeve 500d in a state that the short sleeve 500d of the injection opening 500 for grouting material is inserted into the hole to place the flange 500a along the surface of the tubular member 200. It is preferable to apply an adhesive around the hole of the tubular member 200 to prevent a fray, or to fuse the threads by making a hole with a tong.

The method for constructing the above described end structure will be described. The tubular member 200, the hollow resilient member 300a, 300b, the hollow diametrically-expansible members 400a, 400b, and others for constructing the end structure are carried into the existing conduit P through the manhole M1 shown in FIG. 29 or the like. First, a hollow resilient member 300a is disposed in the inner surface of an end part of the repairing material 100 and, at a position a predetermined distance away therefrom in the lengthwise direction, a hollow resilient member 300b is disposed in the inner surface of the existing conduit P. In this configuration, each hollow resilient member 300a, 300b is preferably fixed temporarily with an adhesive tape or the like. Next, a tubular member 200 composed of a permeable material is disposed so that its one end slightly protrudes inwardly over the inner hollow resilient member 300a, and the other end protrudes outwardly from the outer hollow resilient member 300b. At this moment, both ends of the tubular member 200 are preferably temporarily secured along the inner periphery of the hollow resilient members 300a, 300b with adhesive tape and the like. The tubular member 200 is mounted with a plurality of injection openings 500 for grouting material in advance.

Thereafter, the inner hollow diametrically-expansible member 400a is assembled inside one end of the tubular member 200, jacks 420a are operated to expand the diameter, and one end of the tubular member 200 is fixed by pressure to the inner surface of the repairing material 100 by making the hollow resilient member 300a deform by compression via the tubular member 200. Then, the outer hollow resilient member 400b is assembled inside the other end of the tubular member 200, jacks 420b are operated to expand the diameter, and the other end of the tubular member 200 is fixed by pressure to the inner surface of the existing conduit P by making the hollow resilient member 300b deform by compression via the tubular member 200. Thus the end structure shown in FIG. 26 is achieved.

Moreover, the other end of the existing conduit P indicated by E2 in FIG. 29 is preferably sealed by an end structure which is equivalent to the above described end structure except providing no injection opening 500 for grouting material, and in a state that the other end E2 is sealed, injection of the grouting material is performed by connecting a hose to each injection opening 500 for grouting material. In this process, there is no need for waiting until the sealing material is cured as is the case with conventional method in which each end is sealed with a curable material such as mortar, the injection of the grouting material can be initiated right after the construction of the end structure, sealing can be ensured even when water is flowing inside the existing conduit P, moreover since a tubular member 200 made of a permeable material is used for the sealing portion, air and excessive water are discharged to the outside through the tubular member 200 thus stabilizing the quality of grouting material after being cured and also improving reliability. Also, since the end part of the repairing material 100 make both ends of the tubular member 200 securely be fixed by pressure to the inner surface of the existing conduit P and the inner surface of the repairing material 100 by the diameter expansion of the hollow diametrically-expansible members 400a, 400b, the injection pressure of the grouting material can be significantly raised compared to the case in which sealing material such as mortar is used to seal both ends of the conduit, thereby increasing the work efficiently.

After the grouting material is hardened, each hollow diametrically-expansible member 400a, 400b, each hollow resilient member 300a, 300b, and the tubular member 200 are removed. To improve the work efficiency during the removal, it is preferable to apply a mold release agent on the part to be in contact with the grouting material in advance so that the grouting material is easily removed without being integrated with the other part.

In the embodiment so far described, an example is shown in which each hollow resilient member 300a, 300b is disposed outside the tubular member 200, and the injection opening 500 for grouting material is provided on the tubular member 200. However, in the present invention, each hollow resilient member 300a, 300b may be disposed inside the tubular member 200, and the injection opening 500 for grouting material may be provided in the repairing material 100. Such example is shown by a sectional view in FIGS. 30 and 31.

Figure 30:
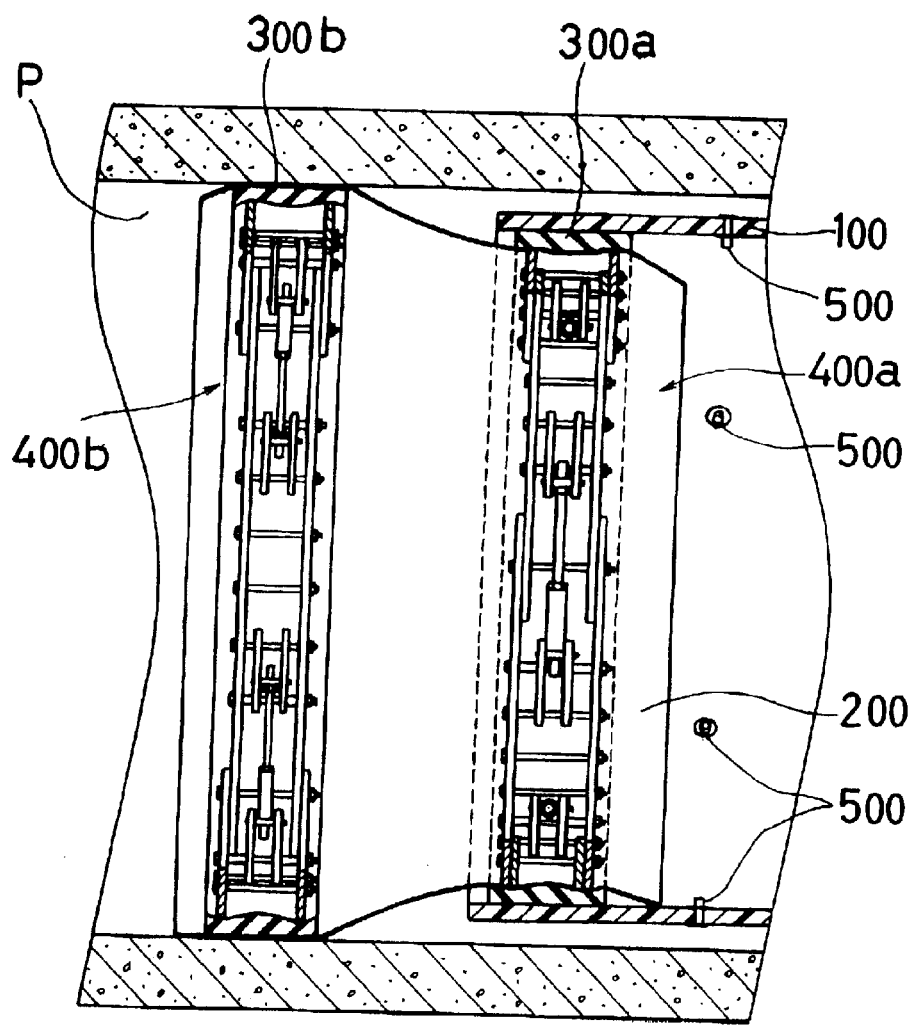
FIG. 30 is a sectional view to show a configuration near the end part of the repairing material of another embodiment of the present invention.

The example shown in FIG. 30 shows that in the end part of the tubular member 200 to be fixed by pressure to the inner surface of the existing conduit P, a hollow resilient member 300b is disposed inside the tubular member 200, and further inside of the hollow resilient member, a hollow diametrically-expansible member 400b is disposed. Then by expanding the hollow diameter expanding member 400b in diameter, the tubular member 200 is fixed by pressure to the inner surface of the existing conduit P. Moreover, FIG. 30 shows that in the end part of the tubular member 200 which is to be fixed by pressure to the inner surface of the repairing material 100, a hollow resilient member 300a is disposed on the outer surface side of the repairing material as with the previous example, and a hollow diametrically-expansible member 400a is disposed on the inner surface side of the tubular member 200.

Figure 31:
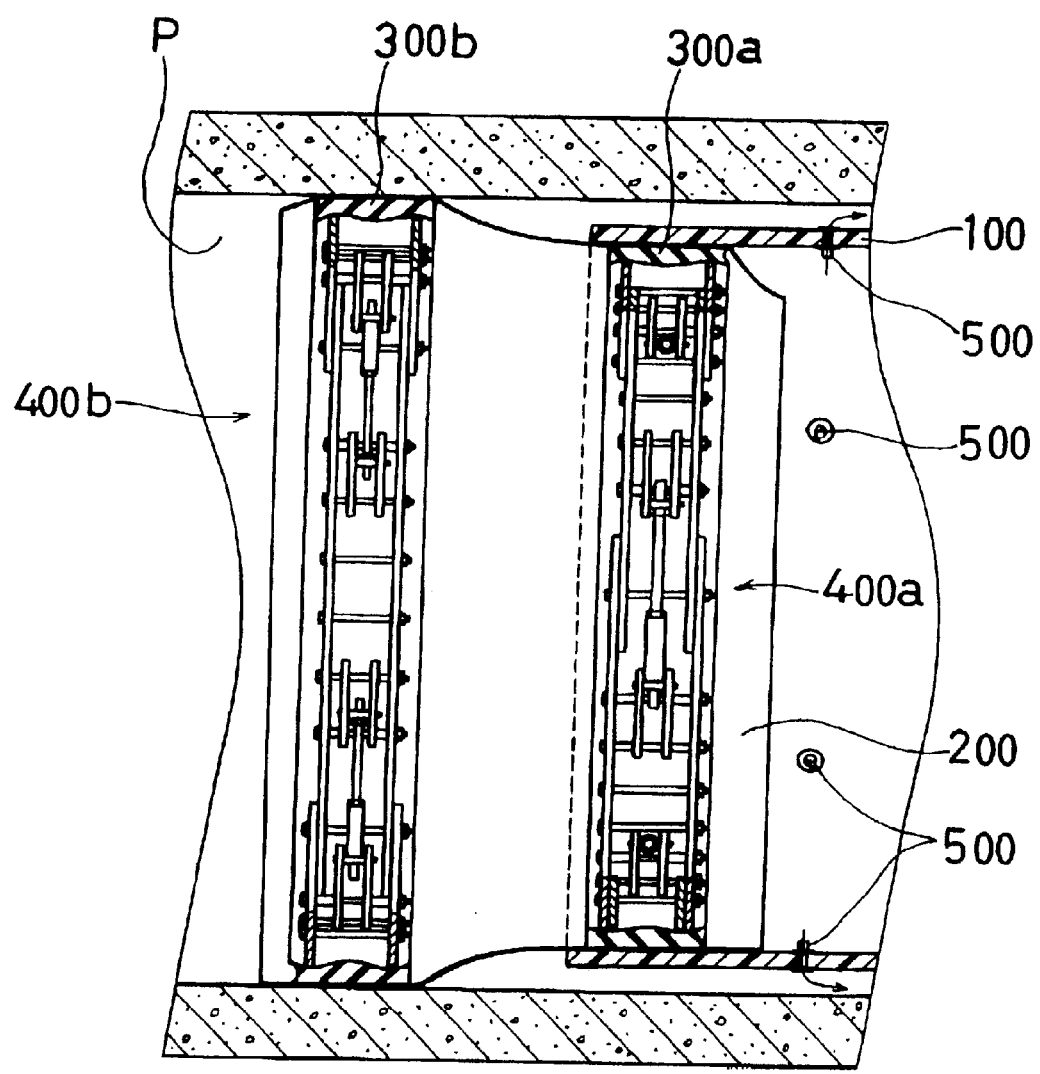
FIG. 31 is sectional view to show a configuration near the end part of the repairing material of still another embodiment of the present invention.

In the example shown in FIG. 31, in both ends of the tubular member 200, hollow resilient members 300a, 300b are disposed on the inner face side of the tubular member 200, and both ends of the tubular member 200 are fixed by pressure to the inner surface of the repairing material 100 or the inner surface of the existing conduit P by means of the hollow diametrically-expansible members 400a, 400b disposed inside the hollow resilient members via the follow resilient members.

In both examples in FIGS. 30 and 31, the injection opening 500 for grouting material is provided in the repairing material 100 near the end part of the tubular member 2. The structure for the mounting of the injection opening 500 for grouting material onto the repairing material 100 may be an equivalent structure for the mounting to the tubular member 200, or may be a structure in which the inner face bar 3 itself is formed with a female thread by use of a tap, and a pipe on which a male thread is formed is screwed into the female thread.

As shown by the examples in FIGS. 30 and 31, by adopting a structure in which the hollow resilient members 300b is disposed inside the tubular member 200 in the part where the tubular part 200 is fixed by pressure to the existing conduit P, and the end part is sealed in a state that the outer surface of the tubular member 200 is in direct contact with the existing conduit P, it is made possible to discharge air accumulated in the upper part of the conduit through the tubular member 200 composed of a permeable material, and to fill up the conduit with a grouting material. In the previous examples shown in FIGS. 26 to 28, since air may be accumulated up to a volume corresponding to the thickness of the hollow resilient member 300b, it is preferable, when there is a slope in the existing conduit P, to provide the injection opening for grouting material in the lower end part so that air can be discharged upwardly while injecting the grouting material.

Also as shown by the example in FIGS. 30 and 31, providing the injection opening 500 for grouting material in the repairing material 100 will allow the air and excess water of the grouting material to be discharged through the tubular member 200 composed of a permeable material, and therefore is preferable.

In each of the above described embodiments, an example is described in which hollow resilient members 300a, 300b are interposed in the portion where both ends of the tubular member 200 are fixed by pressure to the inner surface of the end part of the repairing material 100 and the inner surface of the existing conduit P so that sealing is easily ensured by absorbing the irregularities in the inner surface of the repairing material 100 and the inner surface of the existing conduit P. When there are no large irregularities in those surfaces, hollow resilient members 300a, 300b are not always needed and whether or not to use them may be determined depending the surface irregularity conditions of each inner surface.

INDUSTRIAL APPLICABILITY

As described so far, according to the present invention, a reinforcing body of a hollow skeleton structure is assembled in an existing conduit and inner face bars are attached to the reinforcing body using a method such as fitting, and in that state, a curable infilling is charged between the inner surface of the existing conduit and the inner face bar, and this configuration makes it possible to suitably change the shape and size of the reinforcing members constituting the reinforcing body to construct a reinforcing body having a sufficient strength depending on the degree of the deterioration of the conduit. Therefore, even when repairing a severely degraded conduit that has lost its strength or a large diameter conduit such as a tunnel, it is possible to provide the conduit with enough strength.

Moreover, since the strength of the reinforcing body can be raised sufficiently high, it is possible to select a material with a good fluidity and of a low price for the curable infilling, thus achieving good workability and low cost. It is also possible to cope with the case in which there is a step or a bend in the middle of an existing conduit, and moreover it is possible to construct a reinforcing body having a shape conforming to special-shape conduits such as a horseshoe-shape conduit and a box culvert conduit. Thus repair work can be performed under good workability. Also by adopting the inner face bar made of a thermoplastic molded part, it can be easily deformed to be fitted into the reinforcing body in a step or bend part of a conduit, and in a special shape conduit, thereby achieving a smooth inner surface of the conduit after repair.

Also, in the present invention, since the inner face bars are fitted into the reinforcing body thus being supported thereby, external water pressure will not act only on the inner face bar, and therefore the inner face bar is not likely to deform. Thus the inner face can withstand the injection pressure during the injection of curable infilling thereby eliminating the need of conventional counter measures such as preparing a supporting, and thus, the construction time will be reduced.

Moreover, by exploiting a long body having a length of, for example, a manhole-to-manhole distance for the inner face bar, it is possible to provide the repairing material with a seamless inner face (surface) in the down flow direction, thereby substantially improving the flow capacity compared to the case in which the inner face bar is disposed in a spiral form.

Moreover, according to the present invention, a plurality of inner face bars are attached to the reinforcing body by connecting them in the lengthwise direction by means of inner face bar connecting members, and at connected portions of the inner face bars, end faces of adjacent inner face bars are abutted against each other and these members are connected by means of inner face bar connecting member disposed over the adjacent inner face bars. By this arrangement, the strength of the connected portion of the inner face bars is increased, the connected portion is not likely to deform during injection of curable infilling or due to external (water) pressure or internal (water) pressure, and it is made possible to achieve performance comparable to the case in which a single long inner face bar is used over the whole repairing length of an existing conduit. Furthermore, this arrangement also solves the problems of manufacturing and transportation due to upsizing of the inner face bar, and achieves improvement of workability in the field owing to the ease of handling.

Also, upon mounting the inner face bar on the reinforcing body via a fixing member, a similar arrangement may be made for the fixing bar such that a plurality of fixing bars are connected together in the lengthwise direction of the existing conduit by means of fixing bar connecting members and then attached onto the reinforcing body, and at the connected portion of the fixing bars, end parts of adjacent fixing bars are abutted against each other to connect them together by means of the fixing bar connecting members disposed over the adjacent fixing bars. By this arrangement, the strength of the connected portion of the fixing bars is increased as described above, and it is made possible to achieve performance comparable to the case in which a single long fixing bar is used over the whole repairing length of an existing conduit. Thus, this arrangement can solve the problems of manufacturing and transportation due to upsizing of the inner face bar, and can achieve improvement of workability in the field owing to the ease of handling.

Moreover, by adopting a configuration in which the connecting positions of the inner face bars by means of the inner face bar connecting members, or connecting positions of fixing bars by means of fixing bar connecting members are displaced from each other in the lengthwise direction between circumferentially adjacent pairs, it is made possible to restrict fractures of the curable infilling, because even if a gap is formed in a connected portion caused by force in the lengthwise direction applied to an inner face bar or a fixing bar, and therefore the gap will not grow to be continuous in the circumferential direction.

Furthermore, by adopting a configuration in which the connecting positions of the inner face bars by means of the inner face bar connecting members and the connecting positions of the fixing bars by means of fixing bar connecting means are displaced from each other, it is made possible to enhance the effects of the present invention, to prevent the curable infilling from leaking out to the surface of the inner face bar during the injection of the curable infilling, and to prevent the fluid incoming from the inner and outer surfaces of the existing conduit from flowing into or out of the inner face bar after completing the formation of the repairing material.

Also, by integrating end faces of inner face bars adjacent to each other in the lengthwise direction or end faces of fixing bars adjacent to each other in the lengthwise direction by means of an adhesive or sealing material, or by fusion, it is made possible to ensure the watertightness and connectivity of these connected portions thus enhancing the effects of the present invention.

Moreover, by placing a sealing material between the fixing bar and the inner face bar, it is made possible to construct a watertight structure between the inner face bar and the fixing bar. Particularly, adopting at the same time a configuration, in which the positions of the inner face bar connecting members and the fixing bar connecting members are displaced from each other, allows each inner face bar to be fitted into each fixing bar via a sealing material continuous at the connected portions of the inner face bars. Thus, the watertight structure at the connected portions of the inner face bars is further ensured.

Furthermore, according to the grouting structure of the end part of the conduit repairing material according to the present invention, both ends of a tubular member made of a permeable material are fixed by pressure from inside onto the inner surface of the end part of the repairing material and inner surface of the existing conduit at a position a predetermined distance away therefrom by means of an hollow diametrically-expansible member, and an injection opening for grouting material is provided in the tubular member or the repairing material in the vicinity thereof. By this arrangement, upon injecting grouting material into the gap between the existing conduit and the repairing material, the injection operation of grouting material can be started immediately without waiting for the hardening of the sealing material, the injection end of the grouting material can be sealed securely without being affected by the conditions of the inner surface of the existing conduit such as running water. And also the injection pressure of the grouting material can be raised to a high level than conventional level, thus substantially improving the workability. Moreover, since the tubular member for sealing is made of a permeable material, air and excessive water can be discharged to outside during the injection of the grouting material, thus improving the quality of the grouting material after curing.

Also, by adopting a configuration in which both ends of the tubular member are fixed by pressure to the inner surfaces of the existing conduit and the repairing material with a hollow resilient member interposed therebetween, it is possible to ensure the sealing even when there are irregularities on the inner surfaces of the existing conduit and the repairing material, and to raise the injection pressure of the grouting material even higher.

Moreover, by constructing the end structure of the present invention on one end and constructing another structure, which is equal to the end structure of the present invention excepting the injection opening for grouting material, on the other end, it is made possible to ensure the sealing of both ends of the injection space of the grouting material and to discharge standing air and excessive water in the whole length of the injection space or water intruding from the inside and outside of the conduit, thereby substantially improving the quality of the injected grouting material.

What is claimed is:

1. A repairing method for an existing conduit, comprising the steps of:

preparing a plurality of ring-like reinforcing members capable of being carried into the existing conduit;

assembling said reinforcing members into a hollow skeleton-like reinforcing body extending substantially along the inner surface of the existing conduit by integrating said reinforcing members with a connecting member in the lengthwise direction, so that a plurality of the ring-like reinforcing members are disposed at a predetermined interval in the lengthwise direction of the existing conduit, said connecting members being adjustable in length between the ring-like reinforcing members;

attaching a plurality of inner face bars to the inside of said reinforcing body to assemble them into a tubular form extending along the length of the existing conduit; and thereafter injecting a curable infilling into a gap between said inner face bars and the inner surface of the existing conduit.

2. The repairing method for an existing conduit according to claim 1, characterized in that a plurality of fixing bars are mounted on the inside of said reinforcing body, and said inner face bars are fitted into said fixing bars.

3. The repairing method for an existing conduit according to claim 2, characterized in that a long member continuous in the lengthwise direction of the existing conduit is used as said fixing bar.

4. The repairing method for an existing conduit according to claim 1, characterized in that a long body continuous in the lengthwise direction of the existing conduit is used as said inner face bar.

5. The repairing method of an exiting conduit according to claim 1, characterized in that the step of assembling the reinforcing body comprises:

assembling partial reinforcing bodies from circumferentially divided ring-like reinforcing members and connecting members outside the existing conduit; and thereafter carrying said partial reinforcing bodies into the existing conduit for assembly.

6. The repairing method of an exiting conduit according to claim 1, characterized in that a space-infilling is provided on the periphery of said reinforcing body to reduce or eliminate the gap between the inner periphery of the existing conduit and the reinforcing body with the space-infilling.

7. The repairing method of an exiting conduit according to claim 1, characterized in that said reinforcing body is assembled after a tubular surface bar extending along the inner surface of the existing conduit is disposed on the inner surface of said existing conduit.

8. The repairing method of an exiting conduit according to claim 1, characterized in that injection of the curable infilling is performed through an injection opening for grouting material provided in a permeable material which is laid near an end of the repairing material.

9. A repairing material for use in repairing an existing conduit, comprising:

a reinforcing body having a hollow skeleton structure extending substantially along the inner surface of the existing conduit, the reinforcing body being assembled from a plurality of circumferentially divided ring-like reinforcing members each of which has a plurality of fixing parts in its inside by integrating said reinforcing members with a connecting member in the lengthwise direction, so that a plurality of the ring-like reinforcing members are disposed at a predetermined interval in the lengthwise direction of the existing conduit, said connecting members being adjustable in length between the ring-like reinforcing members; and a plurality of inner face bars each of which has a smooth surface and which are fitted into the fixing parts of said reinforcing members to form the inner surface of the conduit.

10. A repairing material for repairing an existing conduit, comprising:

a reinforcing body having a hollow skeleton structure extending substantially along the inner surface of the existing conduit, the reinforcing body being assembled from a plurality of circumferentially divided ring-like reinforcing members each of which has a plurality of fixing parts in its inside by integrating said reinforcing members with a connecting member in the lengthwise direction, so that a plurality of the ring-like reinforcing members are disposed at a predetermined interval in the lengthwise direction of the existing conduit, said connecting members being adjustable in length between the ring-like reinforcing members;

a plurality of fixing bars each of which is formed in its outside with a first fixing part to fit into said fixing part and in its inside with a second fixing part; and a plurality of inner face bars each of which has a smooth inner surface and formed either in its outer face or its end part with a fixing part to be fitted into said second fixing part.

11. The repairing material for repairing an existing conduit according to claim 10, characterized in that each of said fixing bars is a long member continuous in the lengthwise direction of the existing conduit.

12. The repairing material for repairing an existing conduit according to claim 9 or 10 characterized in that each of said inner face bars is a long body continuous in the lengthwise direction of the existing conduit.

13. The repairing material for repairing an existing conduit according to claim 9 or 10, characterized in that said reinforcing body is formed in its outer periphery with a concavity and convexity for forming a groove-like space which is continuous at least in the lengthwise direction of the existing conduit.

14. The repairing material for repairing an existing conduit according to claim 9 or 10, characterized in that said reinforcing body is formed with a through hole passing in the lengthwise direction of the existing conduit.

15. The repairing material for repairing an existing conduit according to claim 9 or 10, characterized in that said reinforcing body includes a grouting material which can be attached to the outer periphery of the reinforcing body and with which the gap between the reinforcing body and the inner surface of the existing conduit can be reduced or eliminated.

16. A repairing structure for a conduit, wherein a hollow skeleton-like reinforcing body extending substantially along the inner surface of the existing conduit is placed in the existing conduit, said reinforcing body comprising a plurality of ring-like reinforcing members extending substantially along the inner surface of the existing conduit and a plurality of connecting members for connecting and integrating said ring-like reinforcing members together in the lengthwise direction of the existing conduit, said connecting members being adjustable in length between the ring-like reinforcing members.

wherein a plurality of inner face bars which are continuous in the lengthwise direction of the existing conduit are attached to the inside of said reinforcing body, the inner face bars being disposed to form a tubular form extending along the lengthwise direction of the existing conduit, and wherein a curable infilling is provided to fill in the gap between the inner face bars and the inner surface of the existing conduit.

17. The repairing structure for a conduit according to claim 16, characterized in that each of said inner face bars is attached to said reinforcing body via a plurality of fixing bars which are mounted onto the inside of said reinforcing body.

18. The repairing structure for a conduit according to claim 16, characterized in that each of said fixing bars is a long member continuous in the lengthwise direction of the existing conduit.

19. The repairing structure for a conduit according to claim 16, characterized in that said reinforcing body is formed with a through hole passing in the lengthwise direction of the existing conduit.

20. The repairing structure for a conduit according to claim 16, characterized in that a tubular surface bar extending along the inner surface of the existing conduit is interposed between said reinforcing body and the inner surface of the existing conduit, and a curable infilling is provided to fill in the gap between the surface bar and said inner face bar.

21. A repairing structure for an existing conduit, wherein a hollow skeleton-like structure extending substantially along the inner surface of the existing conduit is placed in the existing conduit, said skeleton-like structure comprising a plurality of ring-like reinforcing members extending substantially along the inner surface of the existing conduit and a plurality of connecting members for connecting and integrating said ring-like reinforcing members together in the lengthwise direction of the existing conduit, said connecting members being adjustable in length between the ring-like reinforcing members.

wherein a plurality of inner face bars are attached to the inside of the reinforcing body successively along the lengthwise direction and circumferential direction respectively to be assembled into a tubular form, wherein a pair of inner face bars adjacent in the lengthwise direction of the existing conduit are connected to each other with a inner face bar connecting member, which is disposed spanning over both inner face bars in a state in which their end faces are abutted against each other, and wherein a curable infilling is provided to fill in the gap between the inner face bar and the inner surface of the existing conduit.

22. The repairing structure for a conduit according to claim 21, characterized in that a plurality of fixing bars are attached to the inside of the reinforcing body successively along the lengthwise direction and circumferential direction respectively, and each of said inner face bars is attached to said reinforcing body via each of said fixing bars, and a pair of fixing bars adjacent in the length-wise direction of the existing conduit are connected to each other with their end faces of each member being abutted against each other by means of a fixing bar connecting member, which is disposed spanning over both fixing bars.

23. The repairing structure for a conduit according to claim 21, characterized in that said inner face bar connecting members for connecting two inner face bars adjacent in the lengthwise direction are disposed such that two circumferentially adjacent ones are displaced from each other in the lengthwise direction of the existing conduit.

24. The repairing structure for a conduit according to claim 22, characterized in that said fixing bar connecting members for connecting two fixing bars adjacent in the lengthwise direction of the existing conduit are disposed such that two circumferentially adjacent ones are displaced from each other in the lengthwise direction of the existing conduit.

25. The repairing structure for a conduit according to claim 22, characterized in that said inner face bar connecting members and said fixing bar connecting members are displaced from each other.

26. The repairing structure for a conduit according to claim 22, characterized in that a pair of end faces of said inner face bars and/or said fixing bars adjacent in the lengthwise direction of the existing conduit are integrally connected to each other.

27. The repairing structure for a conduit according to claim 22, characterized in that a sealing material is interposed between said fixing bar and said inner face bar.

28. A repairing structure for an existing conduit, comprising an end structure of a repairing material through which a grouting material is injected into a gap formed between an inner surface of the existing conduit and the repairing material laid inside the conduit, wherein both ends of a tubular member formed of a water permeable material are fixed by pressure from the inside by means of a hollow diametrically-expansible member corresponding to each end onto the inner surface of a longitudinal end part of the repairing material and the inner surface of the existing conduit at a position a predetermined distance away from the end part, and an injection opening for grouting material is provided near the end part of the repairing material or on said tubular member.

29. The repairing structure for a conduit according to claim 28, a hollow resilient member is inserted between each end of said tubular member and the inner surface of the existing conduit or the inner surface of the repairing material, or between each end of said tubular member and each hollow diametrically-expansible member.

30. The repairing structure for an existing conduit according to claim 28, characterized in that the grouting structure is provided on one longitudinal end of the repairing material and, on the other end thereof, both ends of the tubular member made of the permeable material are fixed by pressure from the inside to the inner surface of the other end or the repairing material and the inner surface of the existing conduit at a position a predetermined distance away therefrom by means of a corresponding hollow diametrically-expansible member.

31. The repairing structure for a conduit according to claim 30, characterized in that a hollow resilient member is interposed between both ends of the tubular member, which is provided in the other end of said repairing material, and the inner surface of the existing conduit or the inner surface of the repairing material, or between both ends of said tubular member and the hollow diametrically-expansible member.

* * * * *